US011246256B2

(12) United States Patent
Snyder et al.

(10) Patent No.: US 11,246,256 B2
(45) Date of Patent: Feb. 15, 2022

(54) MACHINE VISION CONTROL SYSTEM FOR PRECISION AGRICULTURE

(71) Applicant: Stout Industrial Technology, Inc., Salinas, CA (US)

(72) Inventors: Steven T. Snyder, Salinas, CA (US); Jeffrey L. Antle, Salinas, CA (US)

(73) Assignee: Stout Industrial Technology, Inc., Salinas, CA (US)

( * ) Notice: Subject to any disclaimer, the term of this patent is extended or adjusted under 35 U.S.C. 154(b) by 0 days.

(21) Appl. No.: 17/172,006

(22) Filed: Feb. 9, 2021

(65) Prior Publication Data

US 2021/0243940 A1 Aug. 12, 2021

Related U.S. Application Data

(60) Provisional application No. 63/074,544, filed on Sep. 4, 2020, provisional application No. 62/972,641, filed
(Continued)

(51) Int. Cl.
*A01B 71/02* (2006.01)
*A01B 63/00* (2006.01)
(Continued)

(52) U.S. Cl.
CPC ............ *A01B 71/02* (2013.01); *A01B 63/002* (2013.01); *A01B 63/008* (2013.01); *A01B 63/10* (2013.01);
(Continued)

(58) Field of Classification Search
CPC ..... A01B 79/005; A01B 63/008; A01B 63/10; A01B 79/00; A01B 63/002; A01B 63/00; A01B 63/02; A01B 71/002; A01B 71/00; G06K 9/00657; G06K 9/627; G06K 9/0063; G06K 9/00624; G06K 9/00; G06K 9/6268; G06K 9/6267; G06K 9/62; A01M 21/02; A01M 21/00
See application file for complete search history.

(56) References Cited

U.S. PATENT DOCUMENTS 2,920,707 A 1/1960 Oliphant
3,851,451 A 12/1974 Agness et al.
(Continued)

FOREIGN PATENT DOCUMENTS

EP 1116427 9/2004
EP 3278649 8/2017
(Continued)

OTHER PUBLICATIONS

John Deere; 600FD-Flexible Draper Active Header Height Control (AHHC) Quick Reference Guide; Downloaded from the Internet on Feb. 4, 2020 from https://www.deere.com/assets/pdfs/common/parts-and-service/manuals-training/600FD-Flexible-Draper.pdf.
(Continued)

*Primary Examiner* — Christopher J. Novosad
(74) *Attorney, Agent, or Firm* — Frost Brown Todd LLC; Dennis S. Schell

(57) ABSTRACT

An illustrative control system for an precision agricultural implement includes a controller having a convolutional neural network, a machine vision module, a plurality of sensors, and a plurality of actuators in communication with the controller, the plurality of actuators including a plurality of agricultural tool actuators.

21 Claims, 17 Drawing Sheets

Related U.S. Application Data on Feb. 10, 2020, provisional application No. 62/971,991, filed on Feb. 9, 2020.

(51) Int. Cl.
  *A01B 79/00* (2006.01)
  *A01B 63/10* (2006.01)
  *A01M 21/02* (2006.01)
  *G06K 9/00* (2006.01)
  *G06K 9/62* (2006.01)

(52) U.S. Cl.
  CPC ............ *A01B 79/005* (2013.01); *A01M 21/02* (2013.01); *G06K 9/00657* (2013.01); *G06K 9/627* (2013.01)

(56) References Cited

U.S. PATENT DOCUMENTS

| | | |
|---|---|---|
| 6,374,155 B1 | 4/2002 | Wallach et al. |
| 9,980,421 B1 | 5/2018 | Hammes |
| 10,008,035 B1 | 6/2018 | Redden et al. |
| 10,390,481 B1 | 8/2019 | Brown et al. |
| 2002/0095239 A1 | 7/2002 | Wallach et al. |
| 2002/0178710 A1 | 12/2002 | Engelstad et al. |
| 2005/0126144 A1 | 6/2005 | Koselka et al. |
| 2006/0012673 A1 | 1/2006 | Koselka et al. |
| 2006/0213167 A1 | 9/2006 | Koselka et al. |
| 2007/0195160 A1 | 8/2007 | Koselka et al. |
| 2008/0155954 A1 | 7/2008 | Schlipf |
| 2009/0210119 A1 | 8/2009 | Poulsen |
| 2010/0037582 A1 | 2/2010 | Sauerwein |
| 2011/0137456 A1 | 6/2011 | Koselka et al. |
| 2011/0211733 A1 | 9/2011 | Schwartz |
| 2012/0048160 A1 | 3/2012 | Adams et al. |
| 2012/0060730 A1 | 3/2012 | Bassett |
| 2013/0204437 A1 | 8/2013 | Koselka et al. |
| 2013/0235183 A1 | 9/2013 | Redden |
| 2013/0238201 A1 | 9/2013 | Redden |
| 2013/0269456 A1 | 10/2013 | Jones |
| 2014/0021267 A1 | 1/2014 | Sudduth et al. |
| 2015/0015697 A1 | 1/2015 | Redden et al. |
| 2015/0027040 A1 | 1/2015 | Redden |
| 2015/0027041 A1 | 1/2015 | Redden |
| 2015/0027043 A1 | 1/2015 | Redden |
| 2015/0027044 A1 | 1/2015 | Redden |
| 2015/0051779 A1 | 2/2015 | Camacho-Cook et al. |
| 2015/0150188 A1 | 6/2015 | Stroot et al. |
| 2015/0237790 A1 | 8/2015 | Redden et al. |
| 2015/0237791 A1 | 8/2015 | Bassett et al. |
| 2015/0245554 A1 | 9/2015 | Redden |
| 2016/0066505 A1 | 3/2016 | Bakke et al. |
| 2016/0157415 A1 | 6/2016 | Cavender-Bares et al. |
| 2016/0255778 A1 | 9/2016 | Redden et al. |
| 2017/0206415 A1 | 7/2017 | Redden |
| 2017/0219711 A1 | 8/2017 | Redden et al. |
| 2017/0227969 A1 | 8/2017 | Murray et al. |
| 2017/0251589 A1 | 9/2017 | Tippery et al. |
| 2017/0290260 A1 | 10/2017 | Redden et al. |
| 2017/0359943 A1 | 12/2017 | Calleija et al. |
| 2018/0116094 A1 | 5/2018 | Redden |
| 2018/0121725 A1 | 5/2018 | Redden et al. |
| 2018/0121726 A1 | 5/2018 | Redden et al. |
| 2018/0153084 A1 | 6/2018 | Calleija et al. |
| 2018/0286117 A1 | 10/2018 | Redden et al. |
| 2018/0325019 A1 | 11/2018 | Connell et al. |
| 2018/0330166 A1 | 11/2018 | Redden et al. |
| 2019/0064363 A1 | 2/2019 | Redden et al. |
| 2019/0188847 A1 | 6/2019 | Gonzalez et al. |
| 2019/0239502 A1 | 8/2019 | Palomares et al. |
| 2019/0261581 A1 | 8/2019 | Redden et al. |
| 2019/0357520 A1 | 11/2019 | Redden et al. |
| 2019/0362146 A1 | 11/2019 | Polzounov et al. |
| 2019/0387678 A1 | 12/2019 | Knopf et al. |
| 2020/0073389 A1 | 3/2020 | Flajolet et al. |
| 2020/0296875 A1 | 9/2020 | Calleija et al. |

FOREIGN PATENT DOCUMENTS

| | | |
|---|---|---|
| EP | 3278649 | 2/2018 |
| KR | 101808686 | 12/2017 |
| WO | 2016099386 | 6/2016 |
| WO | 2016128688 | 8/2016 |
| WO | 2020154515 | 7/2020 |

OTHER PUBLICATIONS

Yangmin XIE, Andrew G. Alleyne, Ashley GREER and Dustin Deneault; Fundamental Limits in Combine Harvester Header Height Control; Article in Journal of Dynamic Systems Measurement and Control; Downloaded from the Internet on Feb. 4, 2020 from https://www.researchgate.net/publication/254261361_Fundamental_Limits_in_Combine_Harvester_Header_Height_Control.

John Deere; HydraFloat integrated suspension system improves ground following article; Downloaded from the Internet on Feb. 4, 2020 from http://salesmanual.deere.com/sales/salesmanual/en_NA/combines_headers/2011/feature/platforms_headers/draper/600d_hydrafloat_integrated_suspension_system.html.

Garford Robo-Pilot product page; Downloaded from the Internet on Feb. 4, 2020 from https://garford.com/products/robo-pilot/.

Garford Hoes Inter-row cultivation equipment product page; Downloaded from the Internet on Feb. 4, 2020 from https://www.nigelquinnams.co.uk/wp-content/uploads/2020/01/Interrow-hoes.pdf.

Garford; Robocrop Precision guided high speed hoes product page; Downloaded from the Internet on Feb. 4, 2020 from https://garford.com/wp-content/uploads/2018/07/Robocrop-Consolepdf.

F Poulsen Aps Engineering; Manual for Mechanical Weeding Robot Robovator; Downloaded from the Internet on Feb. 4, 2020 from http://www.visionweeding.com/ROBOVATOR%20MANUAL_9_english.doc.pdf.

Ferrari Construzioni Meccaniche; Remoweed product page; Downloaded from the Internet on Feb. 4, 2020 from https://ferraricostruzioni.com/modules/cws_downlaoditem/documents/d7dab4eb04e70c3995600c962b79877ad9d14dddREMOWEED_web.pdf.

Garford; Roborop Inrow Inter-row and Inter-Plant Weeder product page; Downloaded from the Internet on Feb. 4, 2020 from https://garford.com/wp-content/uploads/2018/07/Robocrop-InRow-.pdf.

Steketee; IC-Weeder Intellegent hoeing machine with single plant detection brochure; Downloaded from the Internet May 11, 2021 from https://pdf.agriexpo.online/pdf/machinefabriek-steketee-bv/ic-weeder/169628-29429.html.

Planttape Inc.; Three Point Planter; Downloaded from the Internet on May 11, 2021 from https://www.planttape.com/equipment/3-point-planter/.

Search Report and Written Opinion dated Apr. 28, 2021 for PCT/US21/17292.

Written Opinion of the International Searching Authority dated Apr. 28, 2021 for PCT/US21/17292.

MACHINE VISION CONTROL SYSTEM FOR PRECISION AGRICULTURE

CROSS-REFERENCE TO RELATED APPLICATION

This is a nonprovisional patent application of U.S. Provisional Patent Application No. 62/971,991, filed Feb. 9, 2020, and titled MODULAR PRECISION AGRICULTURE IMPLEMENT; U.S. Provisional Patent Application No. 62/972,641, filed Feb. 10, 2020, and titled MODULAR PRECISION AGRICULTURE IMPLEMENT; and U.S. Provisional Patent Application No. 63/074,544, filed Sep. 4, 2020, and titled MODULAR PRECISION AGRICULTURE IMPLEMENT; each of which are incorporated herein by reference.

BACKGROUND

The present invention relates to automated machinery, and particularly, to a machine vision enabled control system for an agricultural implement.

SUMMARY

The present invention may comprise one or more of the features recited in the attached claims, and/or one or more of the following features and combinations thereof.

An illustrative control system for an precision agricultural implement includes a controller having a convolutional neural network, a machine vision module, a plurality of sensors, and a plurality of actuators in communication with the controller, the plurality of actuators including a plurality of agricultural tool actuators.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying Figs. in which.

DESCRIPTION OF THE ILLUSTRATIVE EMBODIMENTS

Figure 1:
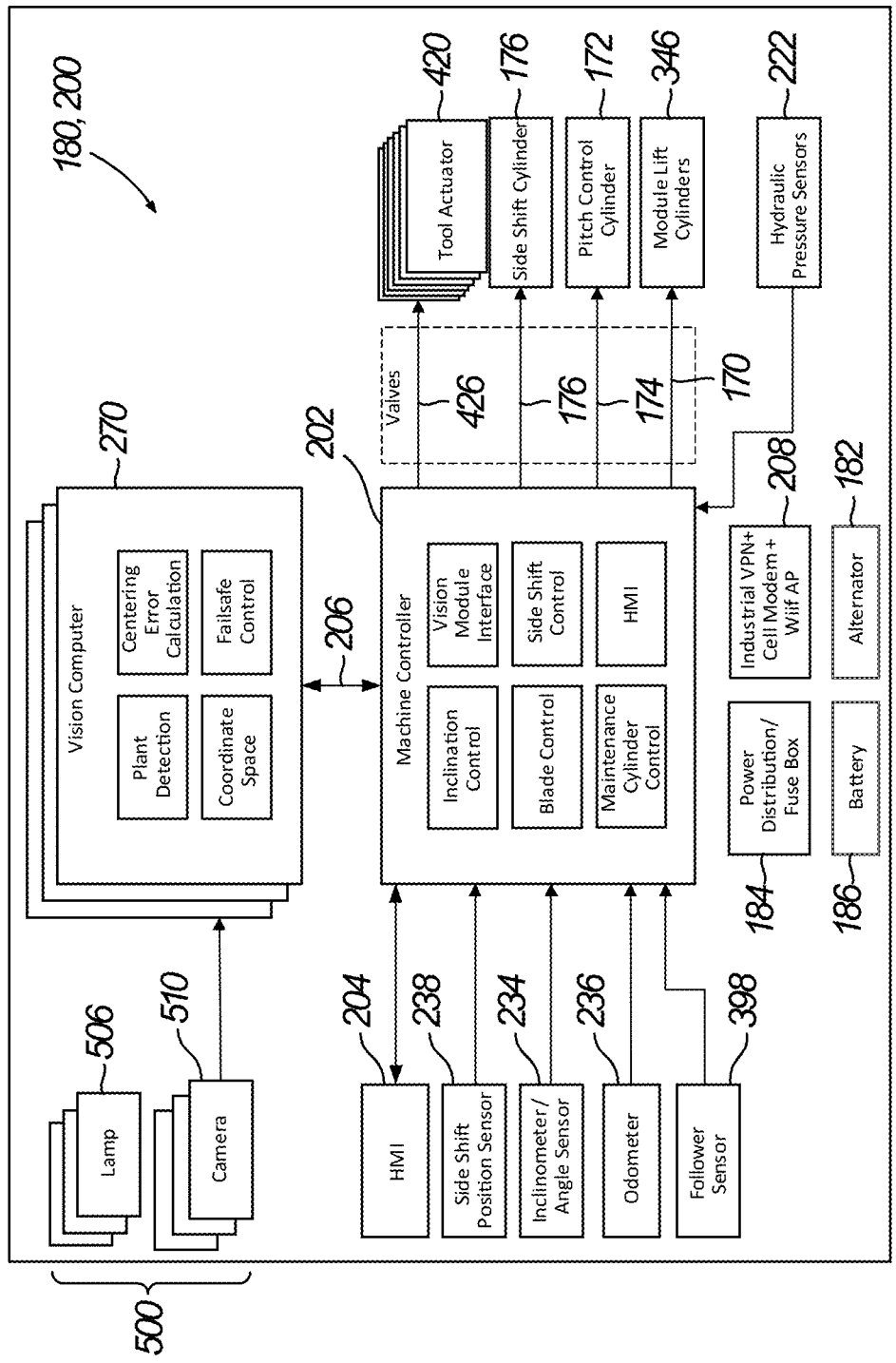
FIG. 1 is a schematic block diagram of an electrical system 180 and control system 200 of the agricultural implement 100 of FIG. 12.

For the purposes of promoting and understanding the principals of the invention, reference will now be made to one or more illustrative embodiments illustrated in the drawings and specific language will be used to describe the same.

Figure 4A:
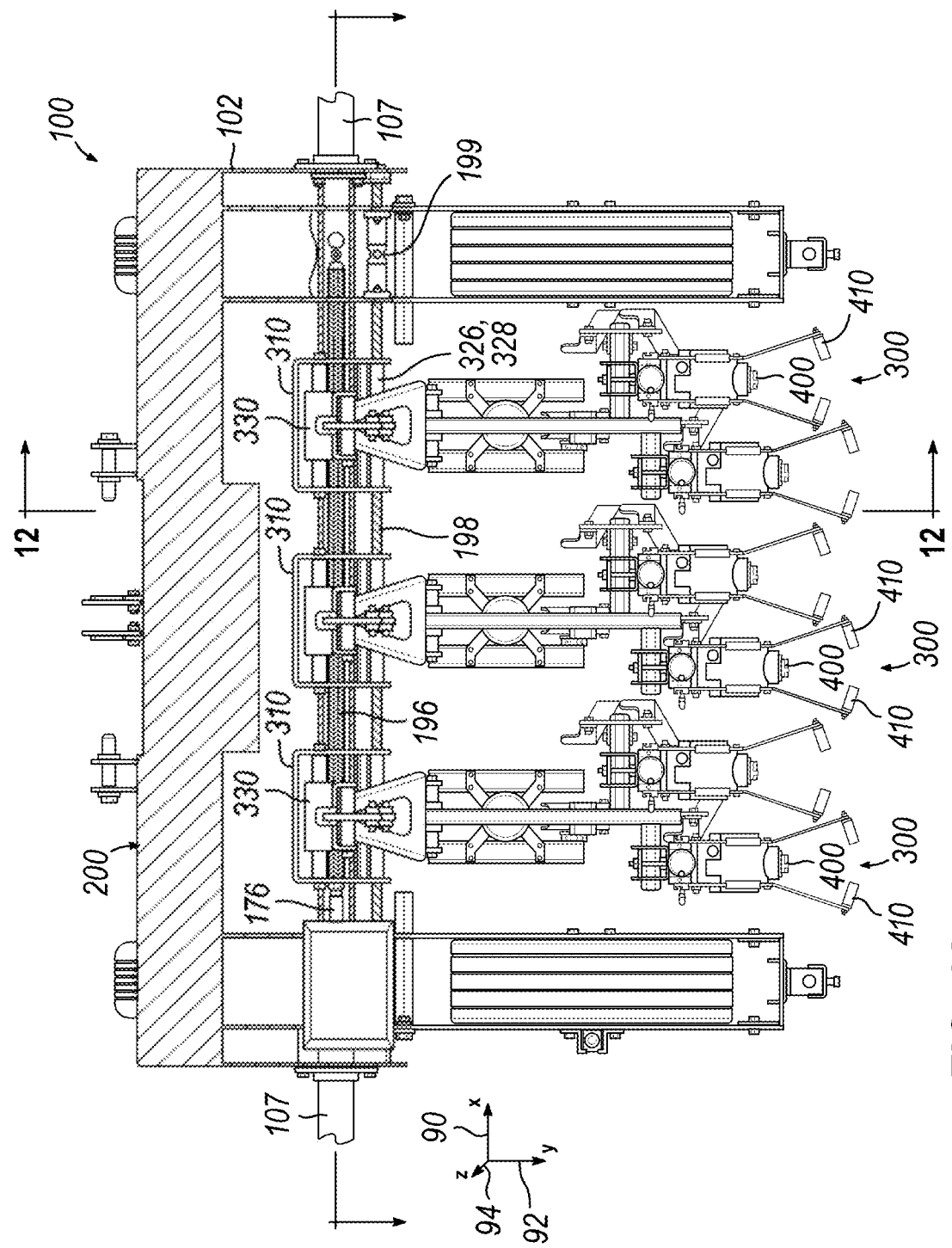
FIG. 4A is a cross-sectional top view of the agricultural implement 100 of FIG. 12 illustrated in a first state.
Figure 5:
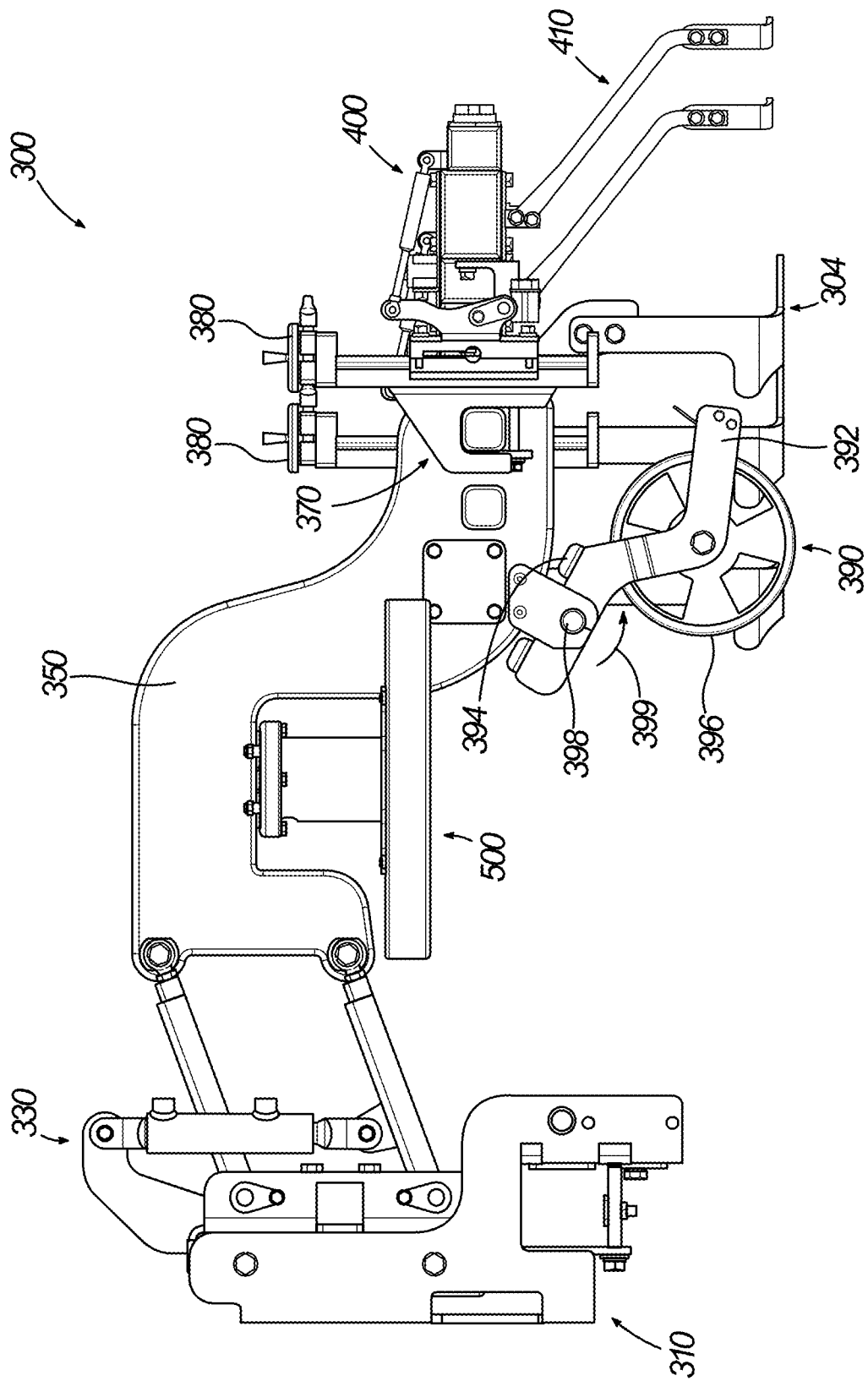
FIG. 5 is an elevational view of a tool arm 300 of the agricultural implement 100 of FIG. 12.
Figure 12:
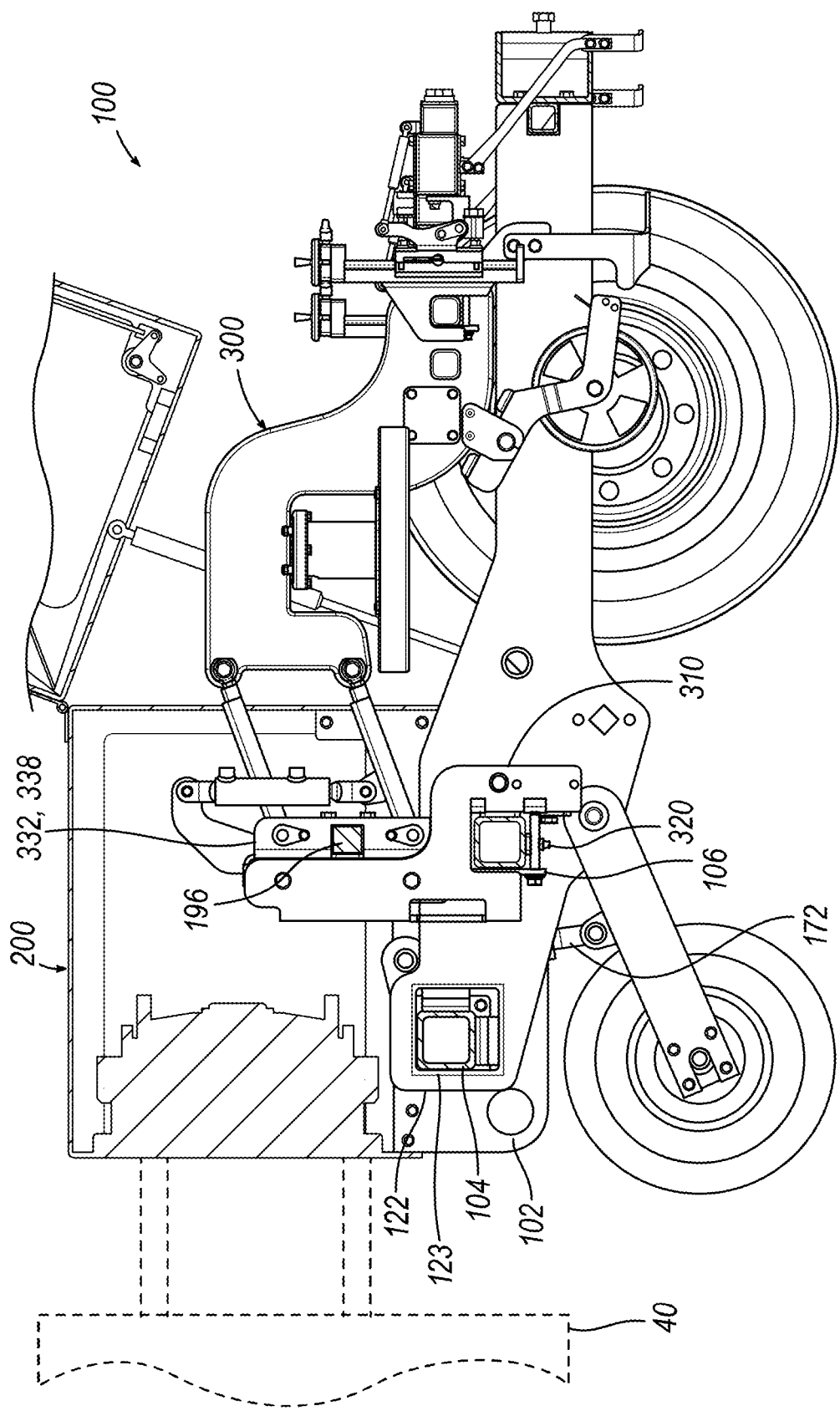
FIG. 12 is a cross-sectional elevational view of an agricultural implement 100 according to the present invention, taken along the section lines illustrated in FIG. 4A.

Referring to FIG. 12, a cross-sectional elevational view, and FIG. 4A, a cross-sectional top view, an illustrative embodiment of modular precision agricultural implement 100 is shown. Implement 100 includes generally a chassis 102, control system 200, and modular smart tool arms 300. For clarity, FIG. 5 illustrates a modular smart tool arm 300 separated from the chassis 102, and FIG. 12 illustrate a chassis 102 without any tool arms 300 attached.

Referring again to FIG. 4A, the illustrated implement 100 includes three tool arms 300, each of which include at least one agricultural tools for working a crop and/or field, for example, a pair of tool attachments 400. However, in other embodiments (not shown) fewer than three or more than three tool arms may be used with implement 100. Each of the tool attachments 400 includes a pair of actuating tools 410, in this example hoes used for cultivating. In FIG. 4A, the tools 410 are shown in an open position; however, upon actuation, each pair of tools 410 travel together, closing the space there between. In alternative embodiments of tool attachment 400, aspects of the tool attachment and the control system 200 (computing and select other components of which may also be referred to collectively as 'controller' herein) may be adapted to providing intelligent tasks other than cultivation, for example, thinning, selective spraying, data collection, and possibly even planting and harvesting. Selective spraying can include actuation and/or controlled movement of to direct delivery from nozzles or other delivery devices to apply wet or dry chemicals to commodity plants 60 or weeds 70, selected varieties of each, or both. Advantageously, chassis 102 and tool arms 300 can be used thereby used with a number of different modular and releasably attachable precision tool attachments 400 in addition to the illustrative tool attachment 400 disclosed herein.

Advantageously, chassis 102 can be propelled across commodity field 50 using standard farm equipment, for example a tractor having a suitable power takeoff (PTO) drive shaft and a hitch (not shown) to pull and operate chassis 102. As will be discussed further below, the hydraulic system 150 and electric system 180 can both be powered by hydraulic pump 152 driven by the tractor PTO.

Figure 2:
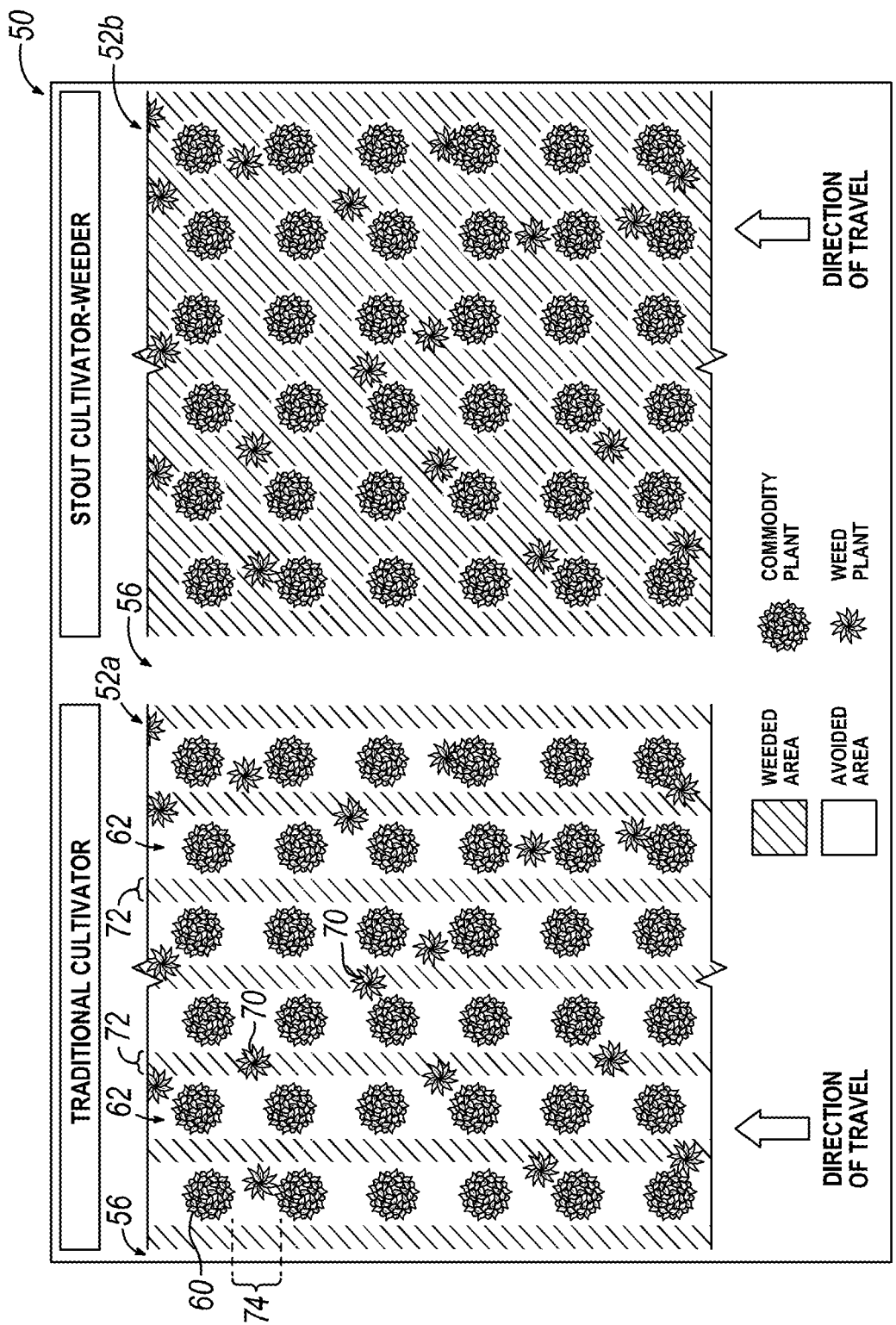
FIG. 2 illustrates commodity bed 52a cultivated with prior art implements and commodity bed 52b cultivated with the agricultural implement 100 of FIG. 12.
Figure 3:
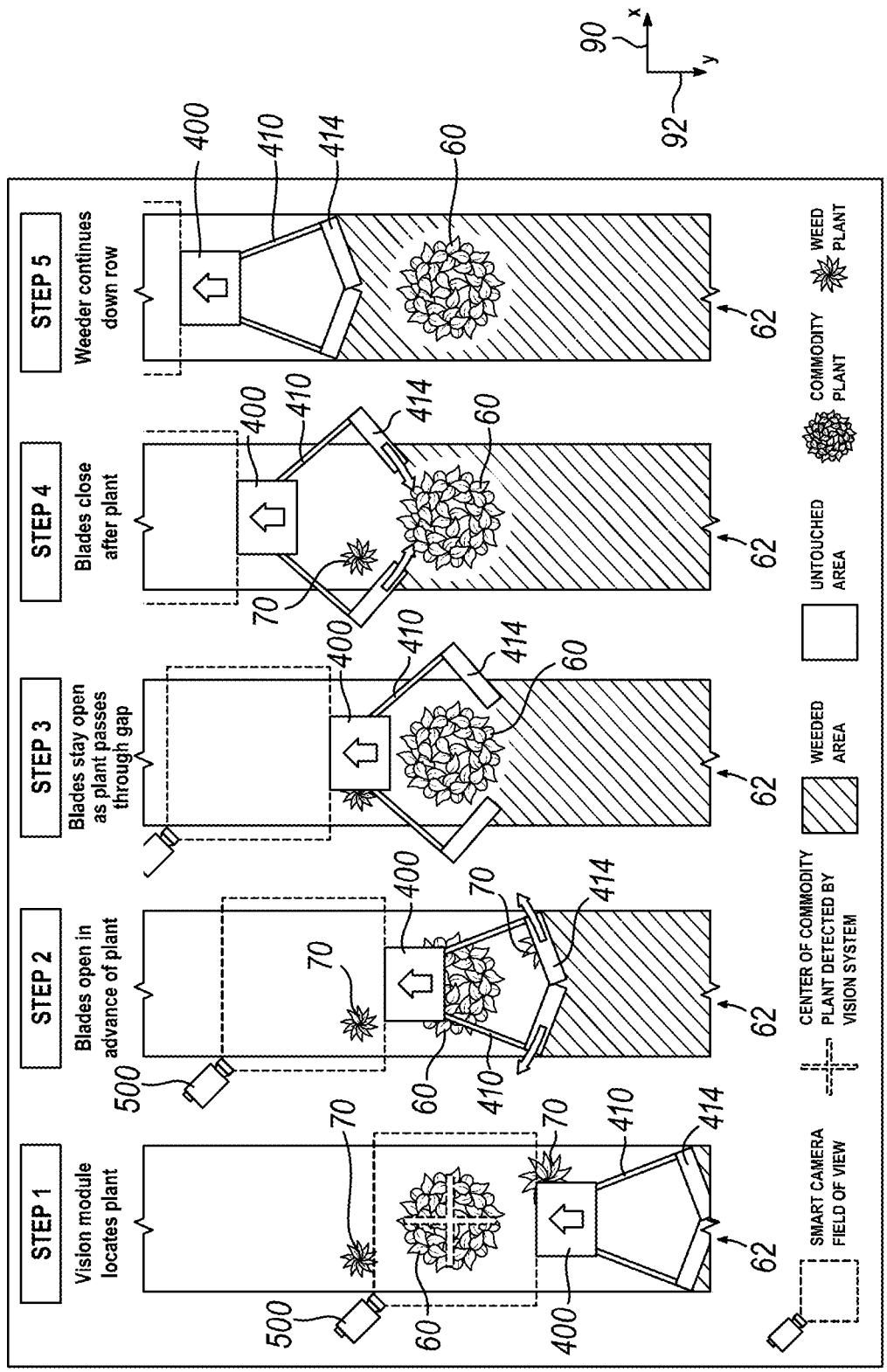
FIG. 3 shows an illustrative process of a portion of agricultural implement 100 of FIG. 12.

To understand an illustrative application of the illustrative implement 100 equipped with tool attachments 400 configured as a cultivator, refer now to FIGS. 2 and 3. Referring first to FIG. 2, commodity field 50 includes raised beds 52a and 52b, each bounded along the sides and separated by furrows 56. An illustrative western specialty row crop, for example, romaine lettuce, is illustrated as commodity plant 60. Bed 52a is illustrative of cultivating to remove weeds 70 using traditional cultivator implements. Specifically, while weeds 70 grow within plant lines 62 in the spaces 74 between the commodity plants 60 and in the spaces 72 between plants lines 62, traditional cultivating only reaches and cuts or otherwise disrupts weeds 70 located in the spaces 72 between the plant lines 62. The reason for this is that with traditional cultivators, the cultivating blades or other tools are static fixed devices which would destroy commodity plants 60 along with the weeds 70, if employed along the plant lines 62. This limitation has traditionally been addressed by using laborers to walk the beds 52a and manually remove the remaining weeds 70 located within spaces 74 between commodity plants 60 of plant lines 62 with a hand hoe.

As illustrated in bed 52b of FIG. 2, the illustrated implement 100 equipped with tool attachments 400 configured as a cultivator can be used advantageously to weed both the space 72 between plant lines 62 and the space 74 between commodity plants 60 within a plant line 62, also commonly referred to as a planting interval for a row or crop row.

FIG. 3 illustrates a portion of the process and features providing this advantage and overcoming the limitation of requiring manual hoeing to effectively cultivate commodity field 50. Referring to step 1 of FIG. 3, as implement 100 is operated along plant lines 62 of commodity field 50b, a control system 200, including a vision module 500 and perception system 270, classifies and locates each commodity plant 60 along each plant line 62. By determining the center point location and/or bounds of each commodity plant 60 the blades 414 of cultivator tool 410 can be actuated to avoid damaging commodity plant 60. For example, as shown in step 2, as blades 414 approach each commodity plant 60 along plant lines 62, cultivator tool attachment 400 then actuates cultivator tool 410 to extend the space between blades 414, as shown in step 3, thereby avoiding cutting or otherwise damaging the commodity plant 60. Referring to step 4, by determining a location of the center point and/or the bounds of each commodity plant, for example, the location of the root structure of the commodity plant at the depth of the blades 414, as the blades 414 of the cultivator tool 410 pass beyond each commodity plant 60 along plant line 62, cultivator tool attachment 400 is actuated again, this time to close the space between blades 414, thereby again acting to remove the weeds 70 between commodity plants 60 within the line 62, for example, as shown in step 5.

The above listed and additional features of the illustrative implement 100 will now be disclosed in further detail, and details of control system 200 will be disclosed further below.

Referring to FIG. 12, a chassis 102 provides a universal, smart, modular implement platform for a variety of precision agricultural implement applications. Chassis 102 generally includes a frame 110, wheel assemblies 120, a hitch receiver 140, a hydraulic system 150, and an electrical system 180. Frame 110 can include a front crossbar 104, a rear crossbar or toolbar 106, and end plates 108. Additional features of chassis 102 that also support the mounting and operation of smart tool arm 300 along with toolbar 106 include plant line alignment bar 196, and threaded rod or screw 198, all of which will be discussed further below. A key distinction in the function of toolbar 106, plant line alignment bar 196, and screw 198 is that the toolbar 106 alone supports the weight of the smart tool arms 300, while the screw 198 and the plant line alignment bar 196 respectfully merely adjust the position of and move a portion of each of the tool arms 300 along the x-axis 90.

The illustrative wheel assemblies 120 are modular and can be slidingly mounted along and then secured in a desired position upon crossbars 104 and 106. The front axle 128 supporting the gauge wheel 130 is further supported by cantilever 132, which is pivotably attached at pivot 134 to the supporting brackets 122. Advantageously, hydraulic cylinder 172 couples between frame 110 and cantilever 132 to adjust the height of gauge wheel 130 relative to frame 110, thereby changing the pitch of the chassis 102 about a longitudinal x-axis 90. The pitch of the chassis 102 is controlled in order to set the pitch angle of blade 414 of tools 410 that will be further disclosed below. For cultivating, it is expected that the blades 414 will be preferred to be flat or to be slightly negative so that the leading edge of blade 414 is lower than the trailing edge of blade 414 to sever and displace the portion of weed 70 above the cut on its root.

An illustrative hitch receiver 140 coupled to crossbar 104 can be used to pull chassis 102 with a three-point hitch as is typically found on farm tractors. The hitch receiver includes lower devises 142 and an upper clevis 146; however, other attachment and hitching systems could be used.

Figure 8A:
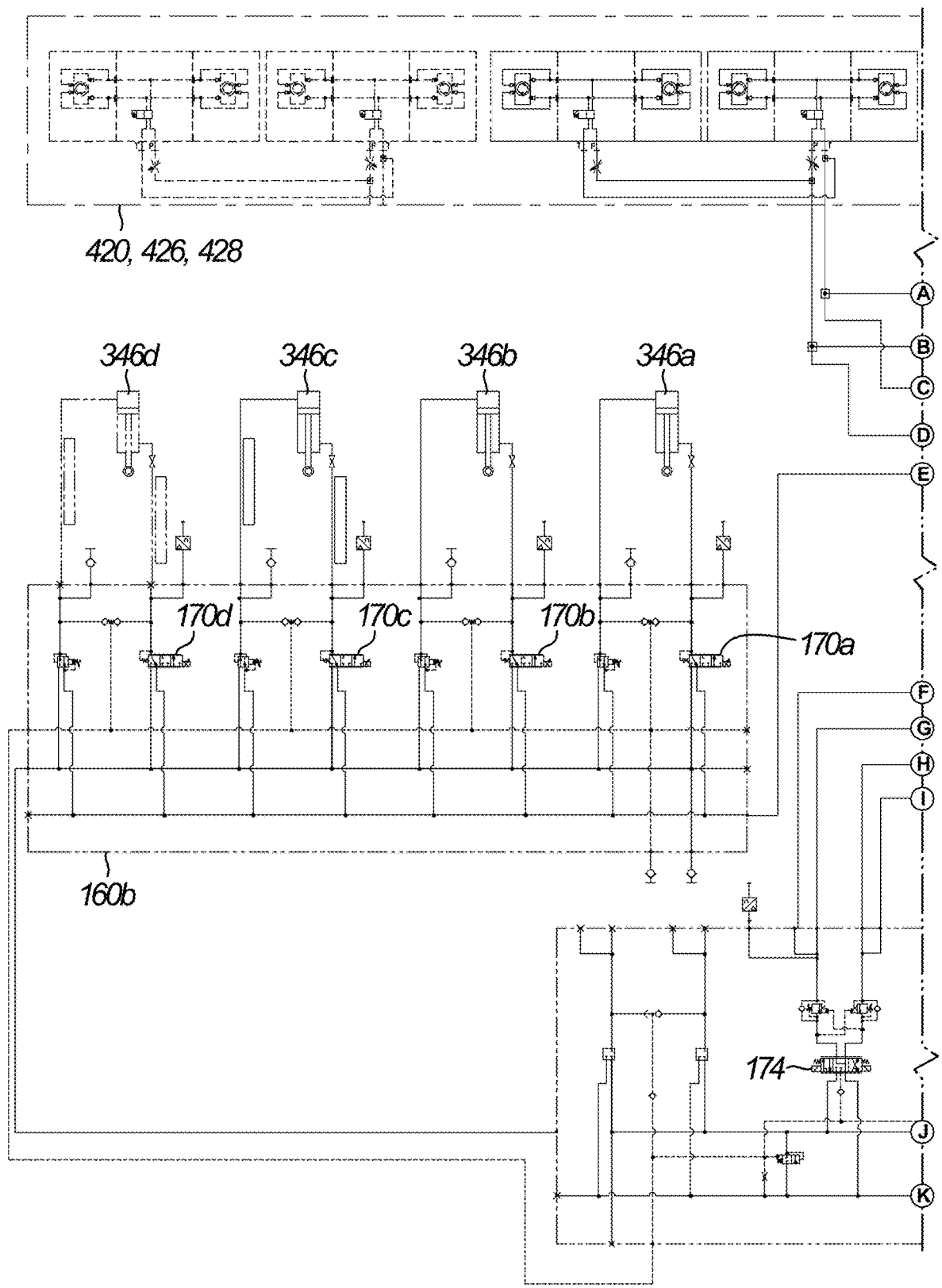
FIGS. 8A and 8B are a schematic diagram of a hydraulic system 150 of the agricultural implement 100 of FIG. 12.
Figure 8B:
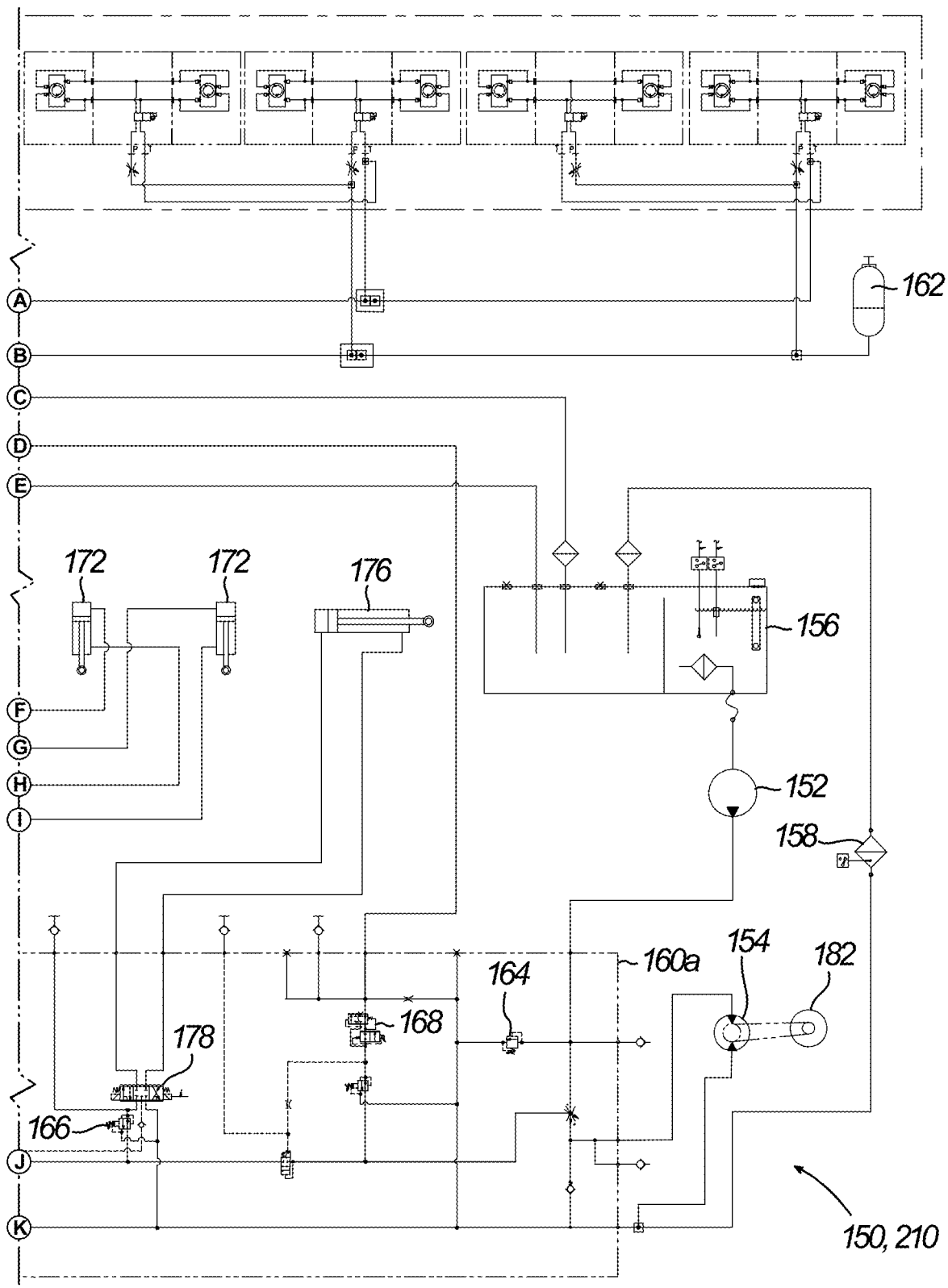

Referring briefly to a schematic of hydraulic system 150 illustrated in FIGS. 8A and 8B, the hydraulic system includes generally a power take off (PTO) driven hydraulic pump 152 to power from a tractor pulling the implement 100 the hydraulic system of chassis 102, hydraulic motor 154, reservoir 156, hydraulic oil cooler 158, distribution manifold 160a/b, accumulator 162, and main regulator 164. Hydraulic motor 154 is driven by the hydraulic oil pressure provided by pump 152. Hydraulic motor 154 in turn drives, for example using a flexible belt, an electrical generator, for example, an alternator 182. Alternator 182, for example an automotive type electric alternator, provides DC electric power for electric system 180. Additional controls and actuators of hydraulic system 150 will be described below in further describing other aspects of implement 100.

Electrical system 180 of chassis 102 can be alternatively powered by alternator 182 or battery 186. Additionally, alternator 182 is capable of charging battery 186. Electrical system 180 includes a power distribution and regulation module 184 (FIG. 1) that can provide regulated voltage, for example 12 V DC and 24 V DC, and voltage and current transient protection. Electrical system 180 can also power thermostatically controlled hydraulic oil cooler fans 188 and control system 200, which will be described further below.

Additional features of chassis 102 will be discussed further below, following a discussion of the modular smart tool arms 300 that can be supported and operated by chassis 102, for example, as is generally shown in FIGS. 12 and 4A.

Referring first to FIGS. 4A and 5, for numerous decades, a toolbar, for example toolbar 106 apart from implement 100, has been the common point of attachment for agricultural tools to configure an implement for particular tasks and for particular commodity fields 50, whether it be for plowing, disking, planting, cultivating, spraying, harvesting, or chopping. In contrast, according to the present disclosure, the function of prior agricultural toolbars can be provided and further improved upon by the illustrative tool arm 300 and the tool platform 370 (FIG. 6) provided therewith. Advantageously, various tool attachments, for example, the illustrative tool attachments 400 shown in FIG. 6, can be releasably mounted to and operated by tool arm 300 at tool platform 370. Various aspects of chassis 102, control system 200, and tool arm 300 provide for modular, repeatable, precision in the configuration and intelligent operation of tool attachments 400.

The tool arm 300 is modular in part in that it includes a mounting structure, for example, mount 310 which enables one or more tool arms to be releasably secured to toolbar 106 of chassis 102, for example, as shown in FIGS. 12 and 4A. The tool arm 300 is also modular in part because of the tool platform 370 and tool attachment 400 modularity introduced briefly above and discussed more specifically further below.

Tool arm 300 is smart (intelligent) in part because it can optionally include a vision module 500 (FIG. 5), enabling intelligent automated operation of tool attachments 400 and optional data collection regarding commodity fields 50, both of which will be discussed further below.

An important aspect of the precision of tool arm 300 is the design and manufacture of a unitary or monolithic member for releasably mounting agricultural tools to, for example, a backbone 350. In the illustrative embodiment shown in FIG. 5, the backbone 350 is milled from a single aluminum billet, for example, approximately 1 to 1½ inch thick, which limits the weight of tool arm 300 while maintaining dimensional stability required for a modular precision agricultural functionality. Backbone 350 can include a number of precision mounting features 364, including for example, the use of location and/or interference fit tolerances in milling and adding features such as receiving bores, threaded bores, locating pins, recesses, and the like. These or other precision features may include with any of linkage mounts 356 adjacent a base end 354, tool mounts 360 adjacent tool end 358, a vision module receiving area 362, and a ground follower mount 366. These features are in contrast to prior art devices providing a tool attachment platform that includes numerous members forming frames and other platforms that lack uniformity of precision between one platform to another and/or that lack dimensional stability and lack light weight that enables precise motion control and ground following of the crop and field operation working portion of the tool arm 300.

As will be evident from the above and below discussions of the operation of implement 100 using control system 200, it is particularly important to maintain precise displacements between the vision module 500, the ground follower 390, and the tool attachment 400, which is why all three are modularly and precision mounted to a billet formed backbone 350.

Figure 6:
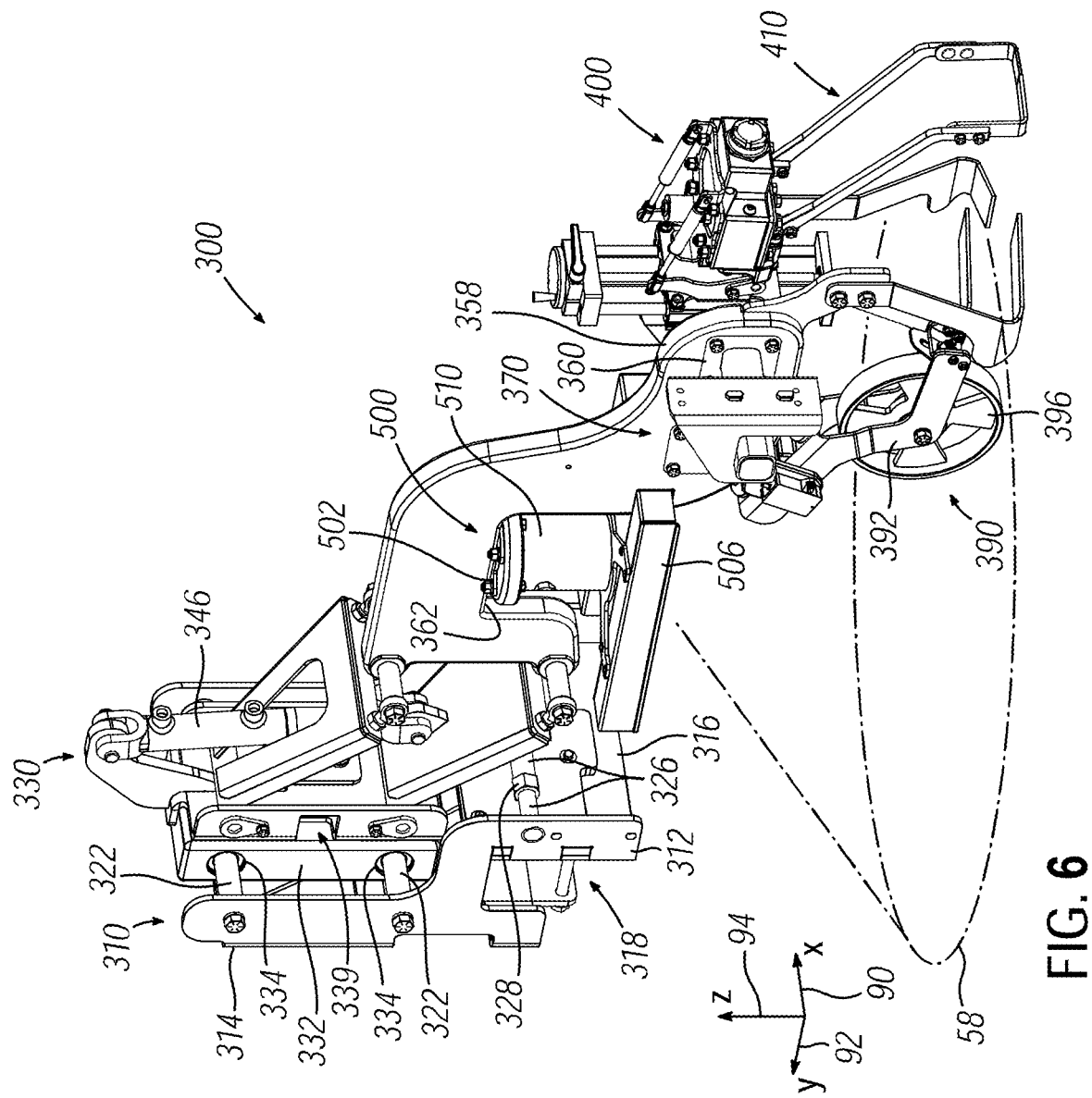
FIG. 6 is an end side perspective view of the tool arm 300 of FIG. 5.

Referring to FIG. 6, tool arm mount 310 includes sides 312, back span 314, front span 316, clamp 320, and guides 322. Sides 312 are rigidly connected with back span 314 and front span 316. These components can be formed, for example, from ¼-⅜ inch steel or other rigid material. Sides 312 define an opening 318 which is sized to receive toolbar 106 so that mount 310 may be secured thereon, for example, as shown in FIG. 12. As shown for FIG. 4A, the clamp 320 can be used to fixedly secure mount 310 onto toolbar 106.

A system of adjustment left or right on toolbar 106 is included with the mount 310 and can be utilized before clamp 320 is secured to more easily move tool arm 300 into a desired position along the length of toolbar 106. Referring to FIG. 6, sides 312 also define bores 324 that provide clearance for threaded rod 198 to pass therethrough. Advantageously, by locating a pair of sleeves 326 around threaded rod 198 and between sides 312, and locating a threaded adjustment nut 328 between the sleeves 326, small adjustments left and right to mount 310 along toolbar 106 can be made. For example, by holding one of adjustment nut 328 and coupling 199 from rotating, while at the same time rotating the other about threaded rod 198, the mount 310 will shift left or right depending on the direction of rotation. For example, a coupling 199 is secured to the threaded rod 198. If coupling 199 is held to prevent rotation while threaded adjustment nut 328 is rotated about the threaded rod 198, the nut will translate left or right on the thread, thereby translating sleeves 326 and mount 310 left or right with it.

Referring again to FIG. 6, backbone 350 of tool arm 300 is coupled to mount 310 by articulating base 330. Advantageously, articulating base 330 provides translation of backbone 350 along the x-axis 90 and the z-axis 94 relative to mount 310. The x-axis 90 is the axis parallel to the longitudinal axis of toolbar 106, and the z-axis 94 is the vertical axis perpendicular to the longitudinal axis of toolbar 106 and perpendicular to the working surface 58 of a commodity field 50. The articulating base 330 includes generally a linear slide table 332, linkages 342 and 344, and a lift actuator, for example, a lift hydraulic cylinder 346 for vertically supporting and translating backbone 350 relative to the mount 310.

Referring to FIG. 6, linear slide table 332 includes linear bearings 334 that translate along guides 322 of mount 310. More specifically, guides 322 can be hardened cylindrical rods that provide a precision and wear resistant surface for linear bearings 334 to ride upon. This configuration advantageously allows backbone 350 and attached tool attachment 400 to translate smoothly and precisely along the x-axis 90 of chassis 102 particularly because movement of the excess mass that would be involved with translating toolbar 106, mount 310, and other additional structure such as frame 110 is avoided.

Still referring to FIG. 6, brackets 338 each define an opening 339 sized for receiving therethrough a plant line alignment bar 196, as is shown in FIGS. 12 and 4A. Referring to FIG. 4A, advantageously, the linear slide tables 332 of each of the tool arms 300 mounted to chassis 102 can be each clamped to alignment bar 196 such that translation of the alignment bar 196 along its longitudinal axis, for example using hydraulic cylinder 176 actuated by side shift valve 178, will simultaneously and equally shift the slide tables 332 and attached backbones 350 and tool attachments 400 of each of the tool arms 300.

Figure 4B:
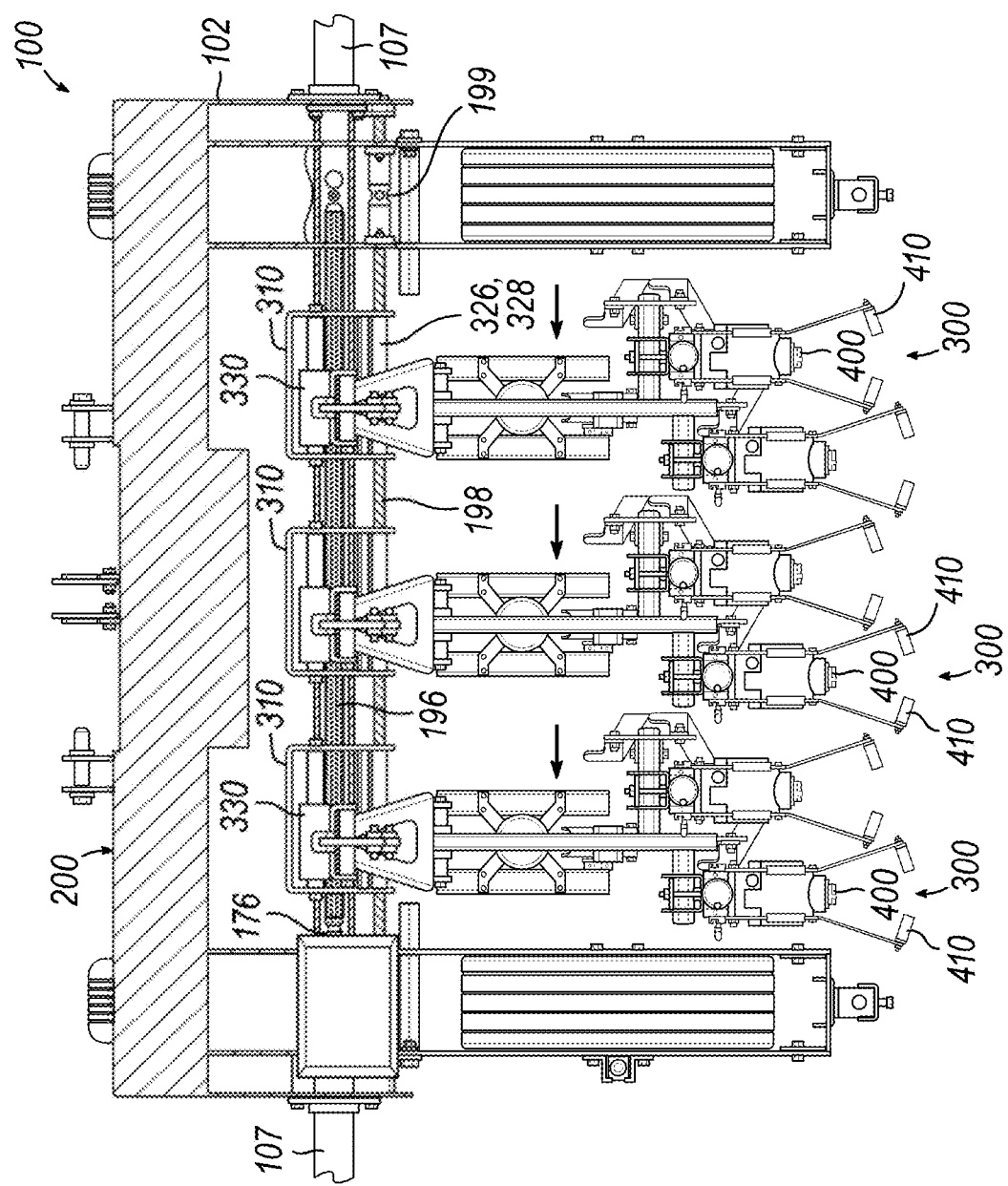
FIG. 4B is a cross-sectional top view of the agricultural implement 100 of FIG. 12 illustrated in a second state.

For example, referring to FIG. 4B and comparing it to FIG. 4A, in FIG. 4B the hydraulic cylinder 176 has been retracted, shifting plant line alignment bar 196 to the left and translating with it the articulating base 330, backbone 350, and tool attachment 400 portions of the tool arms 300. The spacing of the tool arms 300 relative to each other remains precisely the same. Additionally, the large mass components such as mounts 310 of tool arm 300, toolbar 106 and other portions of frame 110 and chassis 102 remain in place.

The movement of the least amount of mass as practical to precisely, smoothly, and quickly shift the tool attachments 400 left and right overcomes various disadvantages found in prior machines. For example, the actuation of hydraulic cylinder 176 left or right can be used to continually and precisely align tool attachments 400 with plant lines 62 of the commodity field 50 to account for shifts in plant lines 62 that occurred during planting and to account for shifts in the tractor pulling chassis 102. Additionally, the control system 200 may include a side shift position sensor 238 (not shown), for example a switch indicating when plant line alignment bar 196 is centrally located, left of center, and right of center, or, alternatively, an absolute position encoder can be used, either of which facilitate closed loop control of the position of plant line alignment bar 196 and thus the position of tool attachments 400 in alignment with plant lines 62.

Referring to FIG. 6, an illustrative four-bar linkage is formed in part by a bottom link 342 coupled between pivot 340 of bracket 338 and linkage mount 356 at base end 354 of backbone 350. The four-bar linkage also includes top link 344 coupled between pivot 340 of bracket 338 and linkage mount 356 of backbone 350. Cantilever 348 is coupled to the linear slide table 332 that brackets 338 are coupled to, and support an end of the lift hydraulic cylinder 346, the opposite end of which is coupled to bottom link 342 approximately mid-span. As arranged, retraction of lift hydraulic cylinder 346 translates backbone 350 and attached tool attachment 400 vertically upward along the z-axis 94 to a lifted or retracted position, as is shown in FIG. 6 and FIG. 12. In other embodiments (not shown) a different pivot and/or linkage structure can be substituted for the four-bar linkage 336 to provide movement through the z-axis 94 for tool arm 300.

The lifted position of tool arm 300 is useful to secure the tool attachments 400 attached to tool arm 300 up and away from the ground, for example, when implement 100 is transitioning between commodity fields 50 or between the end of set of plant lines 62 and the beginning of an adjacent set. Additionally, if operating in a field 50 with fewer plant lines 62 per bed 52 than the implement 100 provides, then one or more tool arms 300 can be selectively actuated to and locked, e.g., manually/hydraulically or via system hydraulic controls 210, in the lifted position so that only those required for the number of plant lines are lowered and used, advantageously, without have to physically remove tool arm 300 or components thereof from implement 100. The height of each tool arm 300 relative to the working surface 58 is set by the extension and retraction of hydraulic cylinders 346 for each tool arms 300 attached to chassis 102.

In one embodiment, the height is controlled by controlling the continuous hydraulic pressure applied to each end of the piston of lift hydraulic cylinder 346. In another embodiment, the height is controlled by controlling the continuous differential of the hydraulic pressure applied across the ends of the piston of the lift hydraulic cylinder 346. In yet another embodiment, discussed further below, the height is controlled by setting a continuous regulated hydraulic pressure to one end of the piston of the lift hydraulic cylinder 346, and by continuously controlling the hydraulic pressure applied to the other end of the piston of the lift hydraulic cylinder. For example, a proportional solenoid valve 170 (FIG. 8A) and analog pressure sensors (unnumbered, FIG. 8A) can be used as part of the control of the hydraulic pressure to control the height of the tool arms 300, as can feedback from a height sensor 398 of tool arms 300 above the working surface 58, as is discussed further below.

For example, upon reaching the end of plant lines 62, the hitch of the tractor pulling chassis 102 can be used to lift it up by hitch receiver 140. A lift sensor, for example, a pressure switch 218 (FIGS. 8A and 8B) associated with gauge wheel hydraulic cylinder 172 can detect that weight is off of the front axle 128 and activate a transit mode of control system 200, or a tilt sensor, accelerometer, ultrasonic sensor, or other motion, orientation, elevation, and distance sensor known in the art may be used. Upon the control system 200 detecting via pressure switch 218 that chassis 102 has been lifted, tool arm lift valves 170 can optionally actuate hydraulic cylinders 346 of the tools arms 300 to lift them to the raised position, thereby providing clearance between tools 410 and the ground. Additionally, if side shift position switch or encoder 238 detects the plant line alignment bar 196 is not mechanically centered, along with tool arms 300, then control system 200 actuates side shift valve 178 and side shift cylinder 176 to a reset position, for example, the alignment bar 196 and attached tool arms 300 are returned to mechanical center of the chassis 102 for the next operation. Additionally, control system 200 can deactivate the processing by vision module 500, perception system 270, and control of tool attachment 400 by ruggedized controller 202 until the chassis 102 has been lowered and weight is again detected on front axle 128 via pressure switch 218, thereby pausing the working of a crop and/or field by an operation of the tool arms 300 at least until the chassis 102 is again lowered.

Returning to the discussion of tool arm 300, lift hydraulic cylinder 346 also can be controlled during operation to lighten the downward force toward the ground of tool arm 300 due to the weight of the various components of the tool arm. By applying hydraulic pressure to each actuation end of lift hydraulic cylinder 346, as introduced above, and individually controlling each of those pressures, thus also controlling the differential pressure, the amount of downward force operating on each tool arm 300 is very dynamically controllable, and responsiveness to following changes in the soil profile/level in the bed 52b for each of the individual tool arms 300, as will be discussed further below in the section further discussing the control system 200.

In a working or down position in which lift hydraulic cylinder 346 is at least partly extended (not shown) the various tool attachments 400 attached to the illustrative embodiment of the tool arm 300 are configured as a cultivator with a preferred operating depth of a short depth under the surface of the soil of bed 52. Referring now to FIGS. 5 and 9, the ground follower 390 of tool arm 300 helps maintain the vertical position of backbone 350 along the z-axis 94 such that the tool attachments 400 supported by the backbone 350 remain at a preferred depth or height relative to a working surface 58 of a field 50. In the illustrative embodiment shown in FIG. 5, ground follower 390 includes a lever 392 pivotably coupled at a proximal end to the backbone 350, extending downward at an angle from the backbone, and coupled to a distal end of the lever is a ski, wheel, and/or other member for contacting and following the working surface 58, for example, a roller 396 rotationally coupled to the lever 392. In the illustrative embodiment, the roller 396 does not support any weight of the tool arm 300 within a normal range of motion through which the lever 392 pivots as the height of backbone 350 above the working surface 58 varies; however, a stop 394, for example, an elastomeric bumper or the like, mounted between the lever 392 and tool arm 300 acts as a mechanical limit to provide a limit to downward reduction of height of the backbone 350 above the working surface 58, thereby limiting the range of downward movement of supported tool attachments 400 along the z-axis 94.

The illustrative embodiment also includes a height sensor 398, for example an angular encoder, for determining the relative height of the backbone and thus the working tools to the working surface 58. For example, the height in the illustrative embodiment is based on an lever pivot angle 399 of the lever 392 to the backbone 350, which changes as the mass of the lever 392 and roller 396 keeps the roller 396 in contact with the working surface 58 as a z-axis distance between the backbone 350 to the working surface 58 changes. In other embodiments the height sensor may be a ranging, accelerometer, or other sensor capable of determining the relative height of the backbone 350 or tool attachments 400 to the working surface 58.

The z-axis 94 location of the end of the various tool attachments 400 attached a tool arm 300 are generally set at a desired height below the bottom of roller 396 and ski 398 for the illustrative application of cultivation. By the control system 200 controlling the hydraulic pressure applied to a first port of the lift hydraulic cylinder 346 to provide upward lift to backbone 350, at least a portion of the weight/mass of and supported by the tool arm 300 is supported and the downward force of the roller 396 is reduced in order to prevent soil compaction and excess lowering of the tool arm, while also maintain enough downward force and system responsiveness to follow the elevation of the soil surface of the bed 52 being worked.

For example, in an illustrative embodiment, a continuous regulated hydraulic pressure of 600 psi provided to a first port of lift hydraulic cylinder 346 that provides upward movement of the backbone 350, and a continuous regulated hydraulic pressure of 200 psi provided to a second port of lift hydraulic cylinder 346 that provides downward movement of the backbone 350, provides a desired 'float,' i.e. upward offset or relief of the weight of and supported by the tool bar 300, to provide responsive following of the working surface 58 by the ground follower 390 and thus the tool arm 300 and supported tool attachments 400, while also preventing excessive compaction of the working surface 58 by the ground follower 390, which would extend the working tools downward beyond a desired height relative to the working surface 58.

Furthermore, in the illustrative embodiment, the control system 200 receives data from one or more pressure sensors 222 for measuring the hydraulic pressure at the first and the second port, or the differential hydraulic pressure, along with receiving data from the height sensor 398, which together are used by the control system 200 to actively regulate one of the continuous differential hydraulic pressure between the first and second port, or the continuous regulated pressure applied to the first port, in order to maintain the tool arm 300 and supported tool attachments 400 at a desired height along the z-axis 96 relative to the working surface 58. In one embodiment, a proportional hydraulic valve 170 controlled by the control system 200 controls a continuous but variable hydraulic pressure to the first port, feedback of that pressure is provided by the pressure sensor 222, and the continuous regulated backside pressure to the second port is preset and not variably controlled. An advantage in responsiveness and precision in desired height of the tool arm 300 over a working surface 58 having varied conditions and varied elevation is provided over prior art designs by the combination of the continuous and regulated downward pressure supplied to the second port, and the continuous variably controlled upward pressure supplied to the first port of the lift hydraulic cylinder 346. In one illustrative embodiment, a separate proportional hydraulic valve 170 and pressure sensor 222 is used for each of the tool arms 300 and hydraulic cylinders 346. In one illustrative embodiment, the control system 200 incorporates a low pass filter to the height control data from the height sensor 398, and/or other damping to the control of the height of the tool arm 300. In another illustrative embodiment, the lever 392 is fixedly mounted to the backbone 350.

Figure 7:
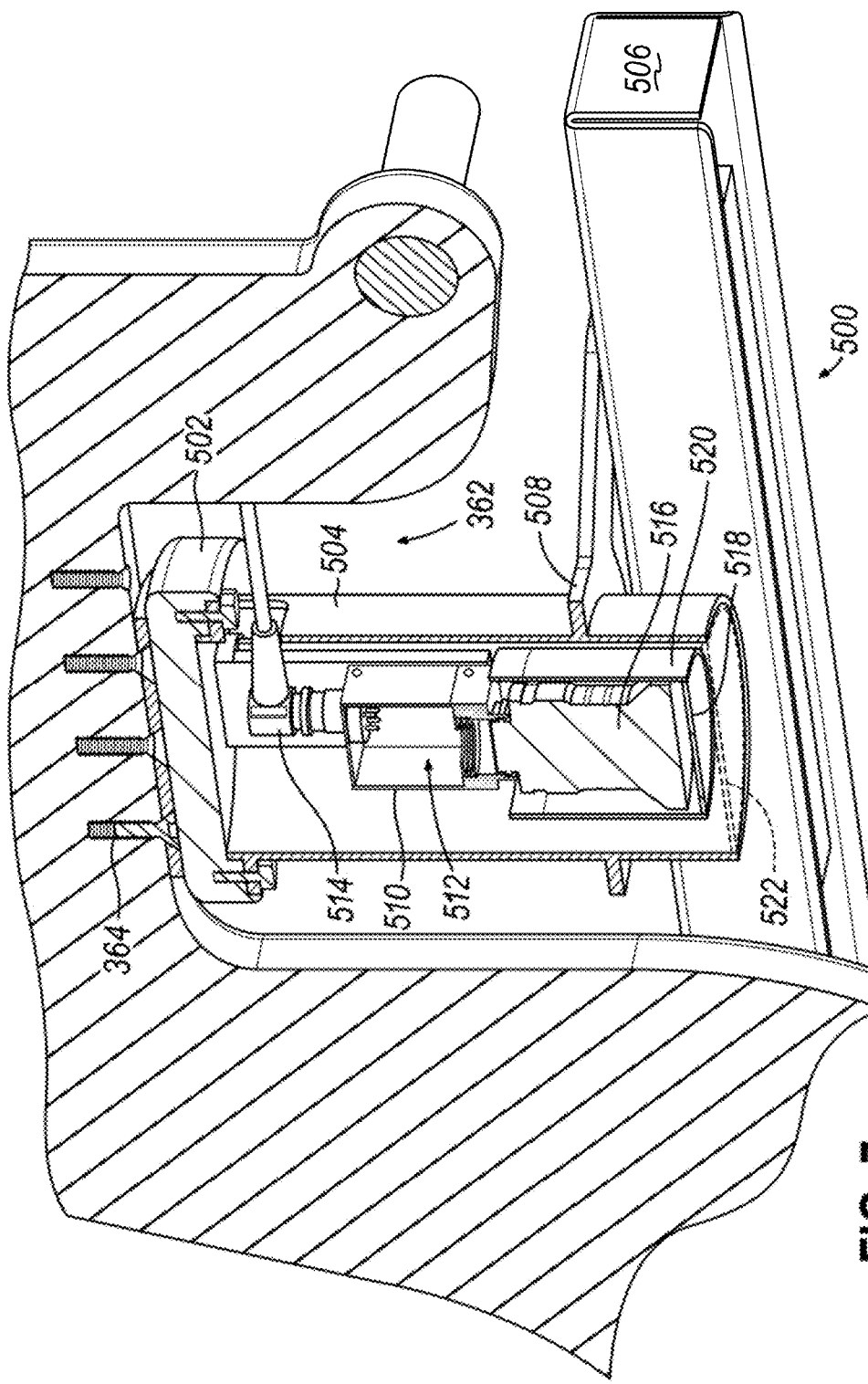
FIG. 7. is a side cross-sectional view of a vision module 500 of the tool arm 300 of FIG. 5.

Referring now to FIGS. 6 and 7, a vision module 500 includes module housing 504 which can be precisely coupled to backbone 350 by mounting interface 502 and precision mounting features 364, for example precisely located threaded bores and/or locator pins, within a protected vision module receiving area 362. The vision module 500 also includes a pair of lamps 506 coupled to vision module housing 504 by lamp mounts 508. In the illustrative embodiment, the lamps 506 are of sufficient intensity to greatly reduce or eliminate the effects of sunlight and resulting shadows that may otherwise be experienced by vision module 500 and associated perception system 270.

In the illustrated embodiment, camera 510 and optics 516 are packaged with a cylindrical vision module housing 514 and optional module housing lens protector 522. Camera 510 is a high-speed digital camera and includes an electronics package 512 and connectors 514, providing high-speed pixel level transmission of digital images to other portions of control system 200, for example to perception system 270 that will be further discussed below. Advantageously, camera 510 can be paired with an optical lens 516, sealed within the optical housing 520 and protected by dust protection lens 518. Determining the correlation for a particular optical lens 516 between the x-axis 90 and y-axis 92 fields of view and distances and the height of vision module 500 above the base of ground follower 390 enables mapping objects of interest from the images to a machine-relative coordinate space used by the control system 200. For example, a field of view of the working surface 58 in one axis equal to twice the focal distance provides a known basis for determining the relative distance between pixels in captured images by knowing the focal distance, which is maintained by the ground follower 390 remaining on and following the working surface 58 of the soil of bed 52b, and taking into account field of view distortion for each pixel, i.e., the optical distance of an object to the camera for a given pixel due to angular offset from the lens' optical/longitudinal axis, versus the linear distance along the working surface 58 of the bed 52.

For example, in the illustrated embodiment of tool arm 300, the displacement of the focal plane of optical lens 516 and camera 510 of the vision module 500 above the bottom of roller 396 and ski 398 is set to a fixed measurement of 18 inches, thus providing an 18 inch field of view across the entire x-axis 90 and also the y-axis 92 of the digital images captured and transmitted by camera 510. A different fixed height measurement and focal view sizes may be used for other cameras and lens combinations, or for tool arms 300 adapted for different functions or crops of taller heights.

The correlation of locations and distances within captured images is critical to determining the timing of when to open and close tools 510 to avoid a commodity plant 60 which has been identified in an image captured a known distance ahead of the tools 410. To improve the correlation of the location of the commodity plant with the actuation of tools 410, it has been found advantageous to take into account fixed, variable, and asynchronous processes relating to detecting and correlating a commodity plant with the machine-relative coordinate space. For example, applying an image timestamp upon the perception system 270 receiving the first data packet containing part of a new image from the vision module 500, and applying a timestamp to data from the odometer encoder 232 based on the midpoint time between the data request and the receipt of the data.

An example of the coordinate space and tracking of the location of objects of interest and the tools 510 in the coordinate space can be understood from steps 1 thru 5 of FIG. 3, which correlate to the change in relative location of the objects of interest, e.g. commodity plant 60 and weeds 70, and the tool blades 414 as the implement 100 traverses the plant line 62. Although shown in a simplified version with only one plant line 62 in a field of view versus two in the illustrative embodiment, each of the steps 1 thru 5 of FIG. 3 correlates to the x-axis 90 and y-axis 92 dimensions of the coordinate space, divided along each axis into a desired level of pixel or bin resolution that corresponding relates to the images and actual distances imaged and traversed.

Referring to FIG. 6, as shown on the left side of tool in 358 of backbone 350, tool arm 300 also includes a tool platform 370 for modular and releasable mounting of tool attachments 400. For example, a platform toolbar 372 may be precisely located on backbone 350 by a tool mount 360. The platform toolbar 372 can support a tool mount 374, which may include precision locating features such as those discussed for backbone 350 for the precise mounting of tool attachment 400 thereto.

Referring to FIG. 6, optionally the tool platform 370 of tool arm 300 may include a device for adjusting or actuating tool attachment 400 relative to backbone 350, for example a z-axis linear slide table 380 as shown in the illustrative embodiment. One reason to include adjustment for each separate tool attachment is due to variations found in commodity fields 50 among different plant lines 62 within the same bed 52a. For example, depending on the formation and environmental conditions such as compaction and erosion of bed 52a, individual plant lines 62 may vary in height. For example, there may be a crest across the bed 52a such that plant lines on one part of the bed are at a lower elevation than plant lines on another part of the bed, which also may vary from the relative elevation of the furrows within which wheel assemblies 120 of the chassis 102 ride.

In the illustrative embodiment, the slide table 380 provides manual adjustment along the z-axis 94 relative to the backbone 350 of a tool attachment 400 mounted to the slide table. The slide table 380 includes linear guides 382 upon which a table 384 may be translated up and down, for example, by cranking adjustment handle 386 and then locking table 384 in the desired position using locking handle 388. The table 384 provides a precision mounting surface for tool attachment 400.

Referring now to FIG. 6, an illustrative tool attachment 400 can be modularly and precisely coupled to tool arms 300. Base 402 is coupled to the tool arm 300, for example, to tool platform 370 or optional z-axis linear slide table 380. A crop or field working tool actuator, for example, actuator 420 of tool attachment 400, can be a hydraulically driven actuator that includes housing 430 coupled to base 402.

In the illustrated example shown in FIG. 6, the tool arm 300 cultivates two adjacent plant lines 62; therefore, each tool arm 300 includes a pair of tool attachments 400, one for each plant line 62. The tool platforms 370 on the left and right side of backbone 350 are spaced along the x-axis 90 so that the distance between the two tool attachments 400 matches the distance between plant lines 62. Additionally, the illustrative tool arm 300 is equipped with static mounts 302 which have attached static cultivators 304, each positioned to cultivate and clear weeds located within the space 72 between plant lines 62.

As discussed earlier above, illustrative tool attachments 400 include tools 410 for cultivating the space 74 between adjacent commodity plants 60 within plant line 62. As illustrated in FIG. 4A, actuator 420 is in a normal and failsafe position in which arms 412 and blades 414 of cultivating tools 410 are spread apart a distance sufficient so that the blades traverse the open space 74 between plant lines 62, as illustrated in FIGS. 2 and 3 and do not contact the root or other portion of commodity plant 60. Upon actuation of tools 410 by actuator 420, shafts 466 extending through covers 432 of the housing 430, and upon which arms 412 are attached by mounting features 468, rotate in a synchronize fashion to translate blades 414 into close proximity, thereby cultivate the space 72 between the commodity plants 60 within the plant line 62.

The actuation of tools 410 provided by the actuator 420 is advantageous in that the movement of the tools 410 are synchronized and provide a transition time between the open and close positions that can be adjustable by an electronic solenoid controlled valve 426, for example, a proportional flow valve set by controller 202 and/or input at HMI 204, and/or a flow regulator 428 (not shown), located directly at housing 430 in the illustrative embodiment to reduce latency and other undesirable characteristics with more remote activation. Additionally, actuator 420 provides a slow initial and final speed and ramping up and down from initial and final speed to the transition speed to avoid impulse like accelerations and decelerations, thereby greatly reducing or eliminating any harmonic induced or other vibrations of arms 412 and blades 414 and also greatly reducing or eliminating disturbance of soil that could damage the commodity plants 60, including from throwing soil onto the commodity plants, as with prior designs, which can inhibit growth and or induce spoilage.

A motion profile provides position sensitive damping, providing damping that prevents jerking of tools 410 near the limits of travel of the actuator, advantageously minimizing or eliminating the throwing of soils by tools 410, particularly soil that could be thrown onto the commodity plants. The motion profile can be provided solely by the hydro-mechanical features, solely by hydraulic valve controls, electro-mechanical features, or a combination of these.

Referring to FIG. 4A, in one illustrative embodiment of implement 100, a second and third set of tools arms 300 are provided by coupling toolbar extensions 107 to each end of the toolbar 106 of chassis 102. Advantageously, the frame 110, wheel assemblies 120, hydraulic system 150, electrical system 180, and control system 200 have all been sized to accommodate the added loads of three sets of on or more tool arms 300, thereby reducing the number of passes required to complete cultivation of a commodity field 50 by a factor of three.

Referring to FIG. 1, a schematic block diagram illustrates aspects of electrical system 180, including control system 200. Control system 200 can includes a ruggedized controller 202, for example, an X90 mobile controller available from B&R Industrial Automation of Roswell, Ga., and a machine vision/perception computer 270, including a graphics processor (GPU) 272 such as a TX2i available from NVIDIA Corp. of Santa Clara, Calif. Controller 202 provides overall machine control of implement 100, and perception computer 270 includes processing of images received from vision module 500, including a neural network, for example, a convolutional neural network (CNN) for AI processing of images and optionally other data to classify, locate, and bound objects of interest, including at least commodity plants 60, and optionally other objects, including for example, weeds 70 and debris (not shown), and to provide a confidence level associated with the classification and/or bounding. Classification of objects of interest may include the plant or weed variety, health, for example, including a disease state/type, and other attributes in the art that are knowable optically. Alternatively, a single computing unit may be substituted and provide the machine control, image, and AI processing. Also alternatively, some or all of the functions provided by one or both of the machine controller 202 and perception computer 270 may be provided by the vision module 500. The perception computer 270 may also include pre-processing of images prior to processing by the CNN, and/or post-processing of data resulting from the CNN processing of images.

In some implementations or selected use of implement 100, control of the tool attachment 400 may only require processing of objects classified as the commodity plant of interest, in other implementations or selected use, control may only require processing of objects classified as weeds or a set of weed types, and in yet another implementation or selected use, control may require processing of both commodity plants and weeds. For example, depending on whether the attached tool attachment 400 is being used for weeding, thinning, or application of chemicals, including selectively on one or both of commodity plants and weeds.

Control system 200 also includes various controls 230, generally interfaced with controller 202, for example via a wireless or wired local area network (LAN) 206, for example, Ethernet. Controls 230 may include HMI 204, for example a touchscreen display device, and various input sensors, including a tilt sensor/inclinometer 234, odometer encoder 236 mounted with axle 124 (FIG. 12), side shift position switch or encoder 238, and various hydraulic pressure sensors 212-222. Control system 200 also includes output controls, generally controlled by controller 202, including valves controlling hydraulic actuators, including cylinders, discussed above. Machine controller 202 thus generally controls actuator 420 to close and open cultivator tools 410 around commodity plants 60, side shift of tool arms 300 to maintain alignment of the tool attachments 400 with plant lines 60, pitch control of blades 414 via control of gauge wheels height, controlling the height of tool arms 300 to maintain proper blade depth 414, and to lift and/or center tools arms 300 in a transit mode when raising of implement 100 is detected.

Perception computer 270 provides the image processing, including bounding, classification, confidence, and location mapping of objects of interest, including commodity plants 60, to implement the general process illustrated by FIG. 4 and discussed further above, including providing the data necessary for some of the processes controlled by controller 202, including the closing and opening of the cultivator tools 410 around commodity plants 60, and side shifting of the tool arms 300 to maintain alignment of the tool attachments 400 with plant lines 60. To do this, perception computer 270 provides generally AI enabled object detection, and maps the detected objects to a relative coordinate space derived from timestamping of displacement data from the odometer encoder 236, image timestamping, and determination of objects of interest, including the centerline of plant lines 62 relative to vision module 500, and thus relative to the tool attachments 400.

Advantageously, the operation of implement 100 is not dependent on GPS or other such absolute or geographic positioning data or systems and can function solely using the relative positions of the plant lines 62 and the commodity plants 60 detected by the perception computer 270. Advantageously, the operation of the control system 200, including perception computer 270 and controller 202, may be autonomous in that it does not require remote data or computer resources; however, a local or remote wireless or wide area network (WAN) connection 208 may be used to remotely monitor, update, or to optionally supplement the data and computing resources of the control system 200.

Figure 9A:
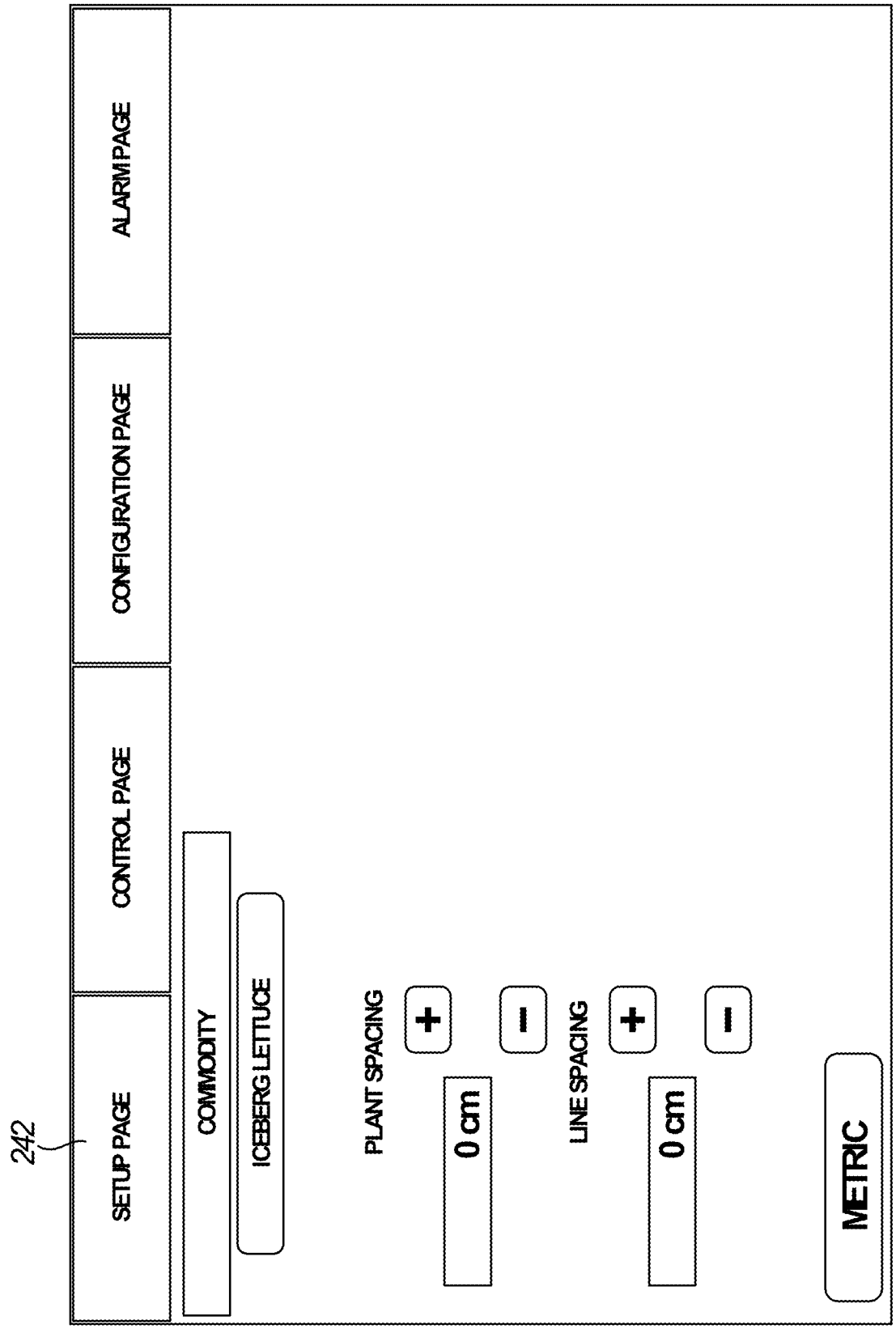
FIGS. 9A-9D are illustrative screen display plans from HMI 204 of control system 200.

Referring to FIG. 9A, an illustrative HMI layout for a setup page 242 is illustrate. For example, the setup of control system 200 can include selecting a commodity plant type, a unit of measurement, and the spacing between commodity plants 62 with the plant line 60 and the spacing between adjacent plant lines 60.

Figure 9B:
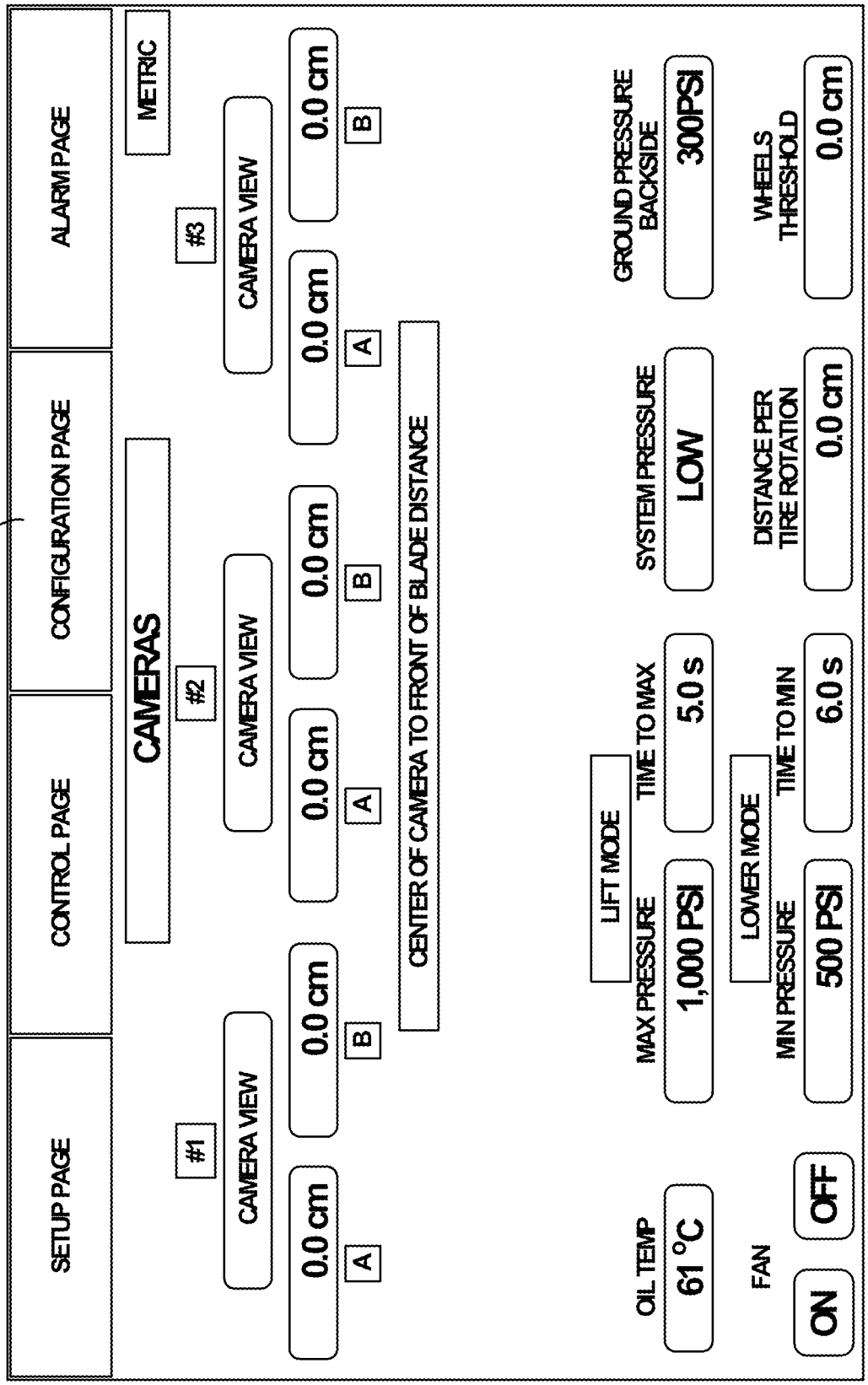

Referring to FIG. 9B, an illustrative HMI layout for a configuration page 244 includes entering the distance from the blades 414 of each tool attachment 400 to the center of field of view of the camera module 500 on that tool arm 300. Other configuration relating to the tool attachment 400 can include timing information relating to the cycling of the blades 414 through their range of motion. Other configuration information includes cooling fan 118 temperature trigger, pressure limit settings and delay and transition times for the actuation up and down for the tool arms 300, odometer 336 calibration for rear wheel 126, ground pressure backside and wheels threshold.

Figure 9C:
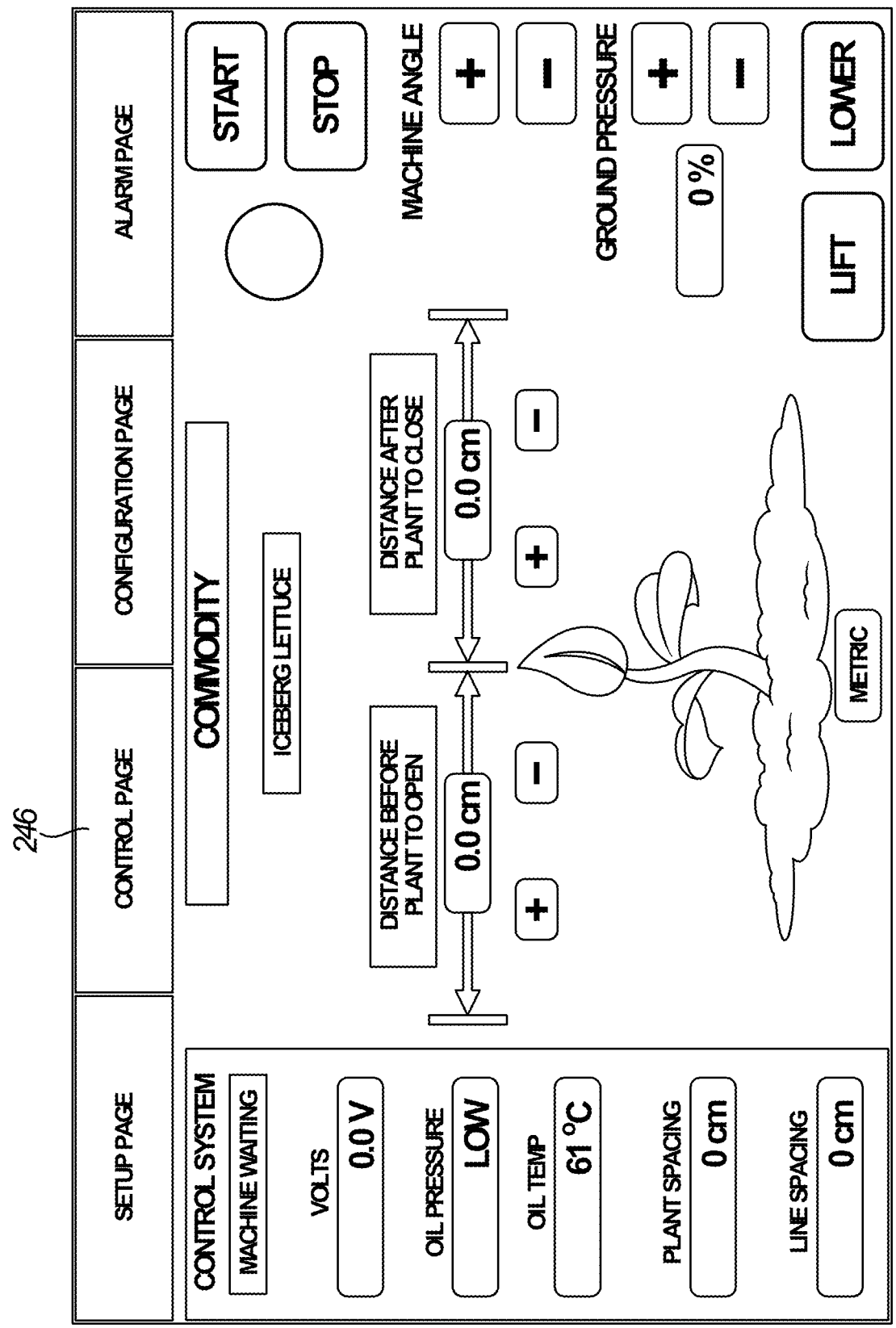

Referring to FIG. 9C, an illustrative HMI layout for an control page 246 is illustrated. Information displayed includes the overall status of control system 200, voltage of electrical system 180, hydraulic oil pressure and temperature, and settings selected on setup page 242. Additional control settings that can be selected include the distance prior to plant center to open tool 410, the distance after plant center to close tool 410, machine angle, which sets the pitch of blades 414, and a percent of ground pressure, which relates to how much the tool arm 300 lift hydraulic cylinder 346 lightens the weight of the tool arm 300 applied to the ground by ground follower 390. And finally, a system start/stop selection and a tool arm lift/lower selection is provided.

Figure 9D:
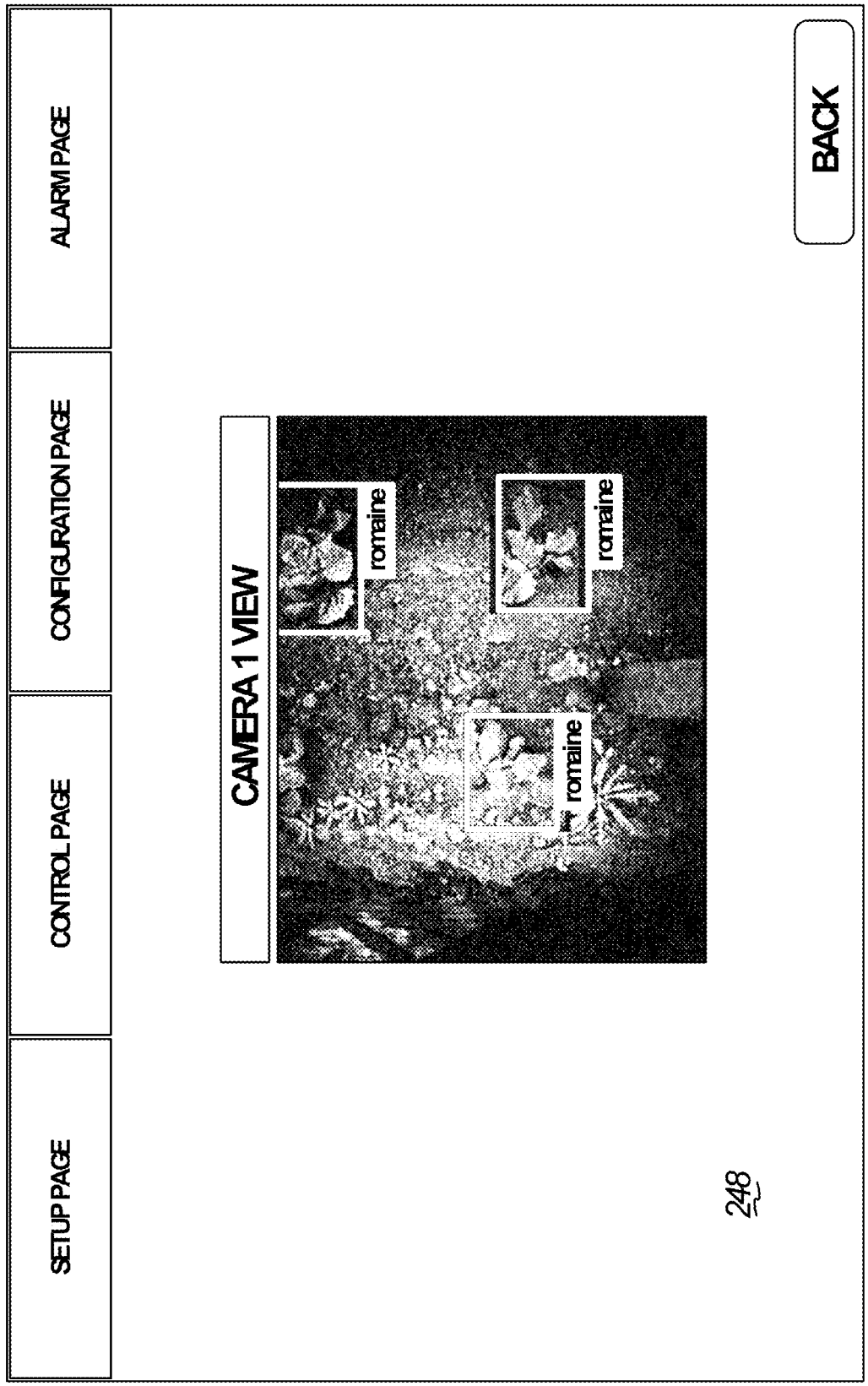

As illustrated by FIG. 9D, the HMI 204 also provides a selectable real-time view from each vision module 500 and an alarm page.

Advantageously each vision module 500, which in the illustrative embodiment includes one camera 510, is centered between two plant lines 60 and has a sufficient field of view for typical spacing between plant lines 60 in beds 52*b* to have within its field of view and process the classification, confidence, location, and/or bounds for up to at least two plant lines 60 simultaneously. Tracking two plant lines 60 by a single camera and image not only reduces hardware requirements, but also provides for more precise plant line following than is provided by one camera centered on and tracking each plant line. Additionally, for embodiments that limit each camera 510 to tracking two plant lines, instead of tracking all plant lines 60 in a bed 52*b*, better resolution, precision, and data collection is provided by the vision module 50.

Lamps 506 are strobed at an intensity near sunlight levels to minimize the impact of variations in sunlight and on shadows that dependent on environmental conditions and time of day. The set of images and data to train the CNN used with perception computer 270 can nonetheless include images taken in various environmental conditions and times to day to improve functionality.

In the operate mode, the processing and control timing accommodates a rate of travel of implement 100 up to a limit, for example, a limit that ensures every commodity plant 62 will appear in at least two images before that plant will be out of the field of view of the camera 510 and approaching the tools 410. Using such a limit improves classification, locating, and tracking and is also required to ensure tools 410 can be actuated and the blades 414 translate to an opened position opened before the arrival of the plant 62 at the blades 414. Alternative or additional criteria for rate of travel may also be used, including commodity plant or environmental conditions warranting a lower rate than the implement 100 may be technically capable off.

Figure 10:
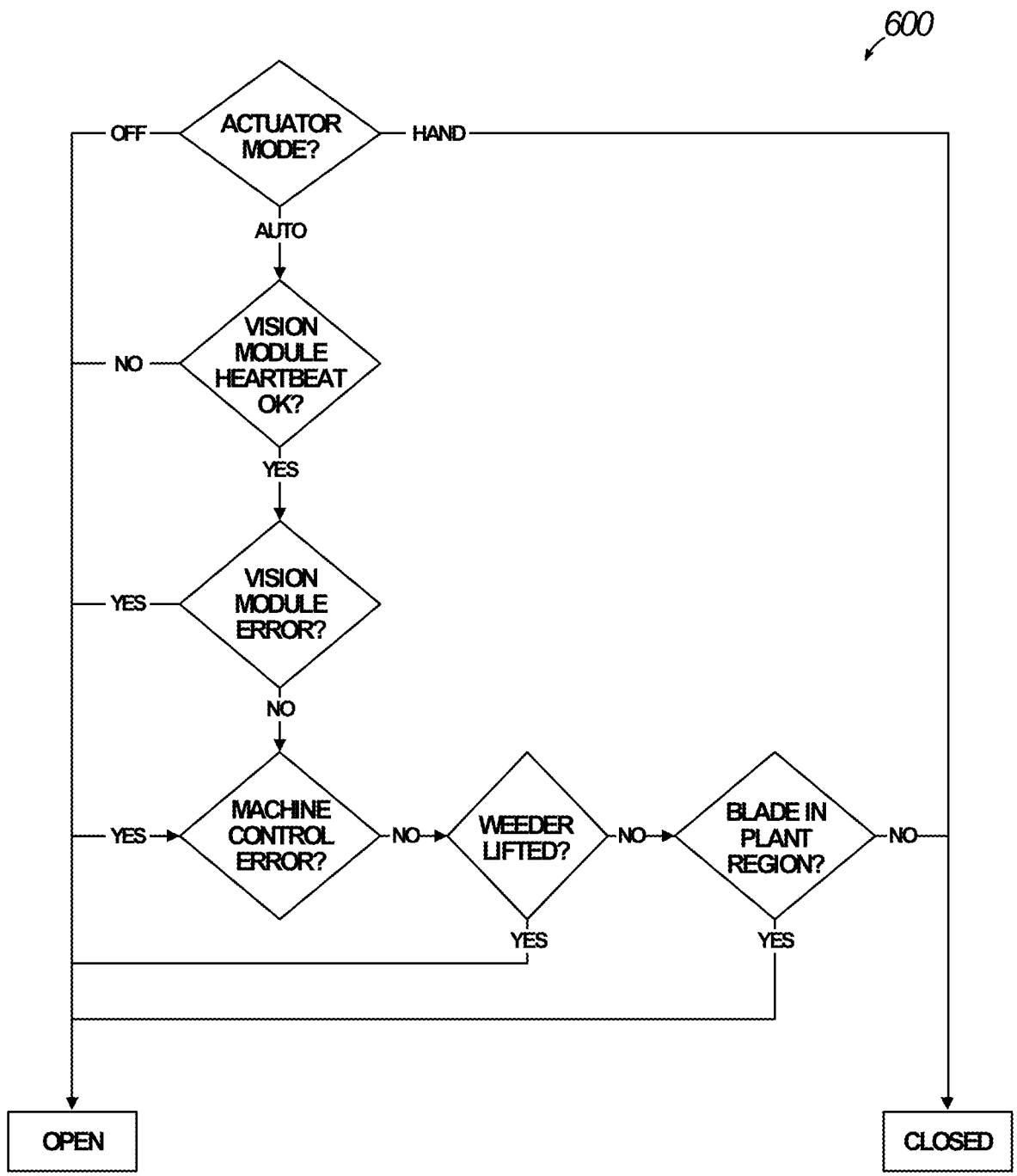
FIG. 10 is an illustrative state machine for actuation of tools 410.

An illustrative state machine for actuation of tools 410 is shown in FIG. 10.

Pre-processing of image data by vision module 500 or perception computer 270 prior to inference processing by the CNN or other AI model can include, but is not limited to, image timestamping, converting the image color space, for example, to RGB, rotating, rescaling the image, and other pre-processing known in the art.

Additionally, post-processing of the object bounds, location, classification, and confidence provided by the CNN or other AI model can be used to reduce errors and provide some fail safes for the AI processed data. For example, when the operation mode is initiated at the beginning of a plant line 62, the tools 410 remain open until commodity plants have been classified and located for a preset span of distance along plant line 62. Also, since the root of a commodity plant 60 is what is being protected for weeding, by actuating the tool 410 to separate the blades 414, post-processing determines the center of the bounded object, thus more precisely locating the root and allowing closer weeding to it. Additionally, detected objects with a confidence level below a selected threshold may be ignored or reclassified, as can objects with a bounding size outside of a threshold range.

Also, threshold ranges can be statically selected, or may be dynamically selected or dynamically adjusted based on average, mean, or other data analysis of object detections for a particular bed 52, field 50, type of commodity plant 60, period of time, or other such adjustment set criteria. For example, commodity plant 60 intervals or bounding size may be dynamic. If commodity plants 60 have been consistently classified and located at a regular interval of distance, if an expected commodity plant 60 is not identified along the plant line 62 at the expected interval, the existence of a commodity plant 60 at that location can optionally be inferred to avoid removing a commodity plant 60 that was not identified by the perception computer 270. Inversely, a potential false positive can be inferred and optionally reclassified for removal, for example, if a commodity plant 60 is classified and located at a location between the regular interval, additionally or alternatively, an outlier from a consistent range of bounding sizes may optionally be inferred to be a false positive.

If the distance between the location of two adjacent commodity plants 60 along a line 62 is too small and is thus insufficient to reliably cycle the tools 410 closed and opened again before the tools 410 traverse the second commodity plant, optionally the objects may be merged and the tools 410 will remain open for the full span of the two commodity plants 60, or non-max suppression may be used to remove the object with a lower confidence level, bounded size, or another such parameter. Additionally, or alternatively, commodity plants 60 located at other than the expected interval may be reclassified or otherwise treated as a weed for removal by tools 410 if thinning of the commodity plants 60 is desired and selected. Commodity plants 60 that are not located within a threshold range of a plant line 62 may also be reclassified or otherwise treated as a weed.

Also, if the inference time is not sufficient to classify and locate commodity plants in time for the tools 410 to be opened, for example, if the implement 100 is being pulled at too high of a speed, the tools 410 will remain open to prevent damage to the plant line 62.

Lastly, pre- and/or post-processing also addresses plant line 62 following and the left-right centering of the tools 410 on each plant line. For example, in the illustrative embodiment a single vision module 500 is used for two adjacent lines 62. Depending on the field of view 58 of the lens 516, objects detected in lines 62 to the right and left of the two lines being worked by the that tool arm 300 may be masked in pre- or post-processing. Also, if a single line 62 is detected for one of the vision modules 500 rather than a pair of lines, rather than post-processing centering the left-right shifting of the tools arms 300 between the two lines, they are offset from the single line the appropriate distance for the line spacing set, for example, via the HMI. Also, left-right shifting may be based on a single selected vision module 500, or based on an averaging or other post-processing data analysis of the relative line locations detected for some or all of the vision modules 500.

For commodity plants 60 and optionally other objects that are classified and for which a location, bounding, and confidence level is desired, the image timestamp is matched to data from the odometer 232 for that timestamp, or, to save communication and computing bandwidth for the odometer, odometer data can be interpolated from the odometer data spanning the image timestamp. The odometer location of the plant can be determined from the timestamp, for example, by offsetting the odometer location based on the conversion from pixels that the plant is from the center of the field of view of the image. Finally, the odometer data increment at which the plant will be located at the location of blades 414 can then be determined by knowing the odometer distance between the center of the field of view of the image and thus camera 510 and the blades 414.

Alternatively, the location mapping of the commodity plants 60 can be done based on odometer and pixel conversions to real world measurement coordinate space, or to a different, even arbitrary measurement and location base for a coordinate space, as long as it correlates to the real world location of the camera 510, blades 414, and plants 60. Additionally, image flow of objects between consecutive images can be processed by perception computer 270 to determine speed and relative distances/locations over time, including when plants 60 will be located at blades 414 without requiring the use of data from an odometer 236.

An illustrative state machine 600 for reliable actuation of tools 410, including the above discussed features, is shown in FIG. 10.

Figure 11:
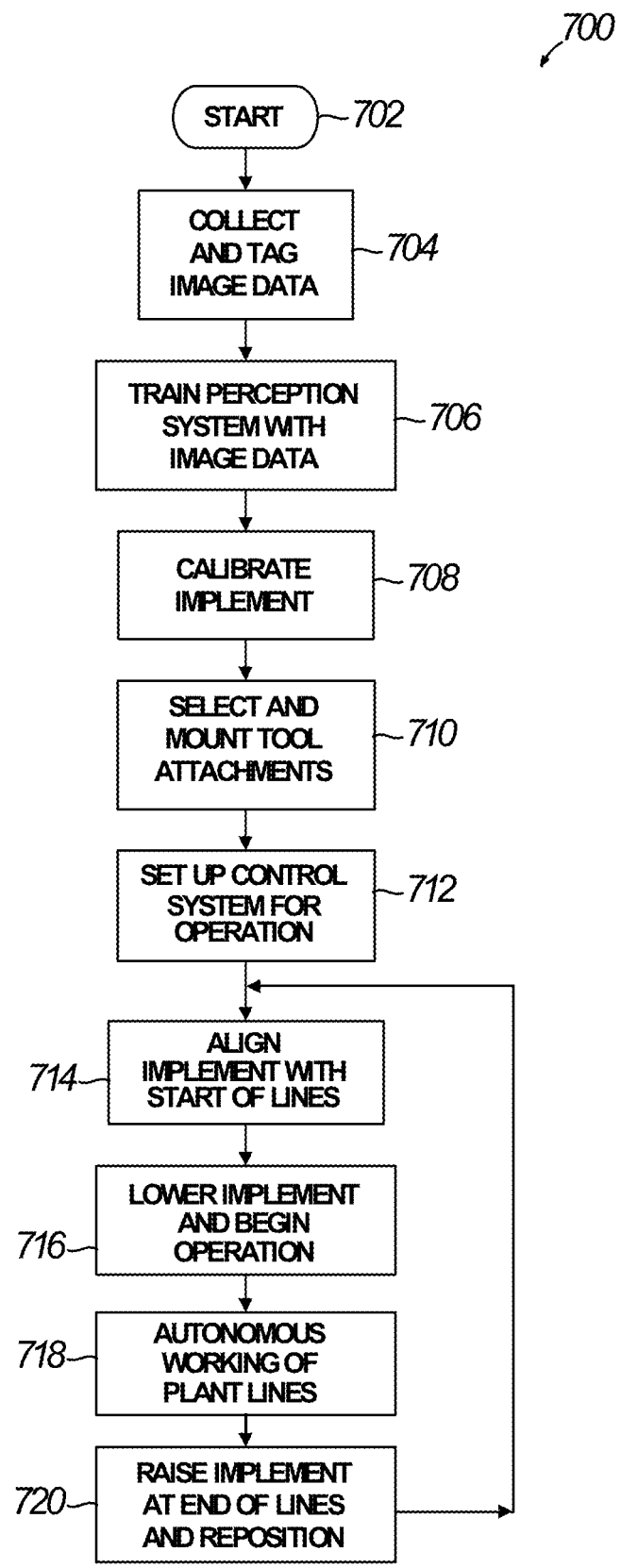
FIG. 11 is an illustrative process of training and operating the agricultural implement of FIG. 12 for a commodity plant field operation.

FIG. 11 is an illustrative process 700 for training and operating implement 100 for a particular operation on a field of a particular type of commodity plant 60. Generally, the first three steps are completed by the implement builder, supplier, and/or service provider, and the remaining steps 704 through 708 are completed by an end user. In step 704 one or more sets of image data relevant to a particular type of commodity plant 60 are collected and objects in the image are tagged, for example objects are tagged as commodity plant, weeds, and/or other objects, including typical debris such as rocks and dead vegetation. Generally the image data will be most effective at training perception system 270 for an acceptably high rate of performance if the image data is collected using the vision module 500 and under all environmental and other conditions expected to be experienced in operation, including variations in soil, soil condition, maturity of or absence of commodity plants and weeds, and the like as is known in the art. In step 706 the perception system 270 is trained using the image data. This step may involve multiple sets of data, training and testing, varying the selected neural network model, varying parameters of the selected neural network model, and/or otherwise tuning the performance of the model as is known in the art of machine learning.

In step 708, the implement is calibrated. For example, various system and subsystem hydraulic pressures of hydraulic system 150 are set with manual regulators and/or the HMI touchscreen 204 as discussed above, any input sensors requiring calibration are calibrated, for example, setting the odometer encoder 232 based on the rear wheel 126 diameter. Additionally, the portion of the hydraulic system 150 operating the lift hydraulic cylinder 346 for the four-bar linkage portion of the tool arm 300 is calibrated to operate within a selected range of differential pressure and individual pressure limits to provide an operator selectability within that range. For example, so that the operator can easily adjust within the preselected range the weight of the tool arm 300 that is carried by the lift hydraulic cylinder 346 versus any weight on the ground applied by the ground follower 390 or the tool 410, depending on desired operation, performance, and characteristics, including but not limited to a desired level of dynamic following of varied soil profile levels, current field conditions, and soil compaction presence and/or avoidance. If the specific tool attachment 400 is mounted to tool arm 300, then the distance from the end effector of the tool, for example, blade 414 to the center of the field of view of vision module 500 is also measured or otherwise verified and set in control system 200. Other additional calibration and or testing may also be completed at this step.

Still referring to FIG. 11, in step 710 an operator selects and mounts the tool attachment 400 for the desired operation and the particular commodity plant type. Advantageously, the same chassis 102 and the same tool arm 300 can be used for a wide range of commodity plant types and a wide range of operations. Training may need to be completed for control system 200 to handle some variations in plant types and operations, and different tool attachments 400 may also be utilized.

Once the tool attachments 400 are mounted to tool arms 300, in step 712 the operator can next provide any desired setting for control system 200 at HMI 204 for that specific operation, including as illustrated in FIGS. 9A-9C and discussed above, and also any additional calibration from step 708 which can now be completed with the mounted tool attachments 400.

In step 714, a vehicle such as a tractor 40 is used to power and navigate the implement 100 to and within a field 50 to be worked. The implement 100 is lined up with the start of the commodity plant lines 62. In step 716, chassis 102 is lowered for operation, for example, using the three-point hitch on a tractor, and the implement is pulled along the plant lines. As discussed above, once control system 200 senses in step 716 that it has been lowered at the beginning of a plant line 62, for example using a weight-on-wheels sensor 218, inclinometer 234, or other sensor, the control system 200 switches from a transit mode to an operate mode, which includes the state machine 600 operation illustrated in FIG. 10.

Because the systems of implement 100 are designed to be automatic once calibrated and set up, for example, including detecting plant lines 62, side shifting tool arms 300 to follow the plant lines, and to complete the selected working operation, such as weeding, on the field 50, advantageously no added in-cab controls are required for monitoring or operating implement 100. The HMI 204 is generally located on the implement 100 and any in-cab controls on the tractor 40 are optional, for example via a wireless device, for example a tablet computer or other handheld or mounted touch screen device, including for optional in-cab observation, changing settings, or initiating or ceasing operation; however, all that is required from tractor 40 to operate implement 100 is navigating across field 50 and raising and lowering the chassis 102 at the beginning and end of the plant lines 62.

In step 718, the control system 200, including machine controller 202 and perception system 270, perform the processing and control discussed above providing autonomous working of the plant lines 62. For example, the processing and control includes, but not limited to, detecting plant lines 62; centering tool arms 300 on plant lines 62; classifying, assigning confidence, bounding, locating and tracking objects of interest, including the above discussed optional pre-/post-processing functions; following the working surface 58 using lift cylinder 346 of tool arm 300, and operating the tool attachment 400 to perform the working operation for the plant lines 62.

In step 720, upon reaching the end of the plant lines 62, the implement 100 is lifted up off the wheels by the tractor 40 pulling the implement. The control system 200 responds by switching from the operate mode to transit mode. In transit mode, control system 200 ceases various operations controlled by machine controller 202 and perception system 270, including detecting plant lines 62, following the working surface 58 with lift cylinder 346, and the operation of the tool attachment 400. Additionally, any reset functions are completed, for example, recentering the tools arms 300 via side-shift actuator 176. If the field 50 is not yet completed, then the process continues at step 714 with aligning the implement 100 at the start of additional plant lines 62 and lowering the implement.

While the invention has been illustrated and described in detail in the foregoing drawings and description, the same is to be considered as illustrative and not restrictive in character, it being understood that only illustrative embodiments thereof have been shown and described and that all changes and modifications that come within the spirit and scope of the invention as defined in the claims and summary are desired to be protected.

REFERENCE NUMERAL LIST

40 Tractor
50 Commodity Field
52a Prior Art Bed
52b New Bed
54 Bed Width
56 Furrow
58 Working Surface/Field-of-View
60 Commodity Plant
62 Line 123 Opening
64 Line Spacing 10"
66 Plant Spacing 10'
70 Weeds
72 Space Between Lines
74 Space Between Plants
80 Plant Center
82 Space Before
84 Space After
90 X-Axis
92 Y-Axis
94 Z-Axis
100 Agricultural Implement
102 Chassis
104 Front Crossbar
106 Rear Crossbar/Toolbar
107 Toolbar Extension
108 End Plate
110 Frame
112 Thrust Plates
114 Cover
116 Hood
118 Tool Mounts [static cultivators]
120 Wheel Assembly
122 Support Brackets
124 Rear Axle
126 Rear Wheel
128 Front Axle
130 Front Wheel/Gauge
132 Front Cantilever
134 Pivot
136 Thrust Plates 138 Wheel Span
140 Hitch Receiver
142 Bottom Hitch Clevis
144 Vertical Slot
146 Top Hitch Clevis
148 Horizontal Slot
150 Hydraulic System
152 PTO Driven Pump
154 Hydraulic Motor
156 Reservoir
158 Oil Cooler
160 Manifold
162 Accumulator
164 Main Regulator
166 Side Shift Regulator
168 Tool Actuator Regulator
170 Tool Arm Lift Valves
172 Gauge/Pitch Actuator
174 Gauge Wheel Valve
176 Side Shift Actuator
178 Side Shift Valve
180 Electrical System
182 Alternator
184 Power Distribution/Regulation
186 Battery
188 Oil Cooler Fans
190 Safety Strut
192 Safety Support
194 Pivots
196 Plant line Alignment Bar
198 Threaded Rod/Screw
199 Rod Coupling
200 Control System
201 Enclosure
202 Machine Controller
204 HMI
206 LAN (Ethernet/Bus)
208 WAN Connection
210 Hydraulic Controls
212 PTO Pump Pressure
214 System Pressure
216 Motor Pressure
218 Gauge Cyl. Pressure Switch
220 Side Shift Press
222 Lift-Upside Press
230 Electric Controls
232 Odometer Encoder
234 Inclinometer
238 Side Shift Position
240 Touch Screen
242 Setup Page
244 Configuration
246 Control
248 Camera View
270 Perception System
272 GPU
274 Ruggedized Housing
280 Convolutional Neural Network
282 Input
284 Output
286 Post Processing
288 Plant Map
290 Training
300 Modular Smart Tool Arm
302 Static Mounts
304 Static Cultivators
306 Raised Position
308 Lowered Position
310 Mount
312 Sides
314 Back Span
316 Front Span
318 Toolbar Passage
320 Clamp
322 Guides
324 Bore
326 Sleeves
328 Adjustment Nut
330 Articulating Base
332 Linear X-Axis Slide Table
334 Linear Bearings
338 Brackets
339 Alignment Bar Opening
340 Pivots
342 Bottom Linkage
344 Top Linkage
346 Lift Hydraulic Cylinder
348 Top Cantilever
350 Backbone
352 Billet
354 Base End
356 Linkage Mounts
358 Tool End
360 Tool Mount
362 Vision Module Receiving Area
364 Precision Mount Features
366 Ground Follower Mount
370 Tool Platform
372 Toolbar
374 Tool Mount
376 Precision Locator Features
380 Z-Axis Linear Slide Table
382 Linear Guides
384 Table
386 Adjust
388 Lock
390 Ground Follower
392 Lever
394 Stop
396 Roller
398 Height Sensor
399 Lever Pivot
400 Tool Attachment
402 Base
404 Mounting Features
406 Bracket
408 Pivot
410 tools—Cultivator
412 Arm
414 Blade
416 Pitch Angle
418 A/B Open/Close Position
420 Actuator
422 Pneumatic Damper
426 Proportional Solenoid Valve
428 Flow Regulator
430 Housing
432 Cover
434 Cavity
436 Bearing
440 Actuator Shuttle
442 Rack Teeth
444 Ends
446 Larger Bore 448 Bore End
450 Smaller Bore
452 Bore End
460 Pinion Gear
462 Body
464 Teeth
466 Shaft
468 Tool Mounting Features
470 Plug
471 Shoulder
472 Stem
474 Piston Head
476 Sealing Areas
478 Valve Receiver Bore
480 Fluid Channel
482 Recess/Supply Area
488 Spring
490 Valve
492 Valve Shaft
494 Bevel
496 Port
498 Valve Seat
500 Vision Module
502 Mounting Interface
504 Module Housing
506 Lamps
508 Lamp Mounting
510 Camera
512 Electronics Package
514 Connectors
516 Optical Lens
518 Dust Lens
520 Optics Housing
522 Module Housing Lens Protector

The invention claimed is:

1. An control system for an precision agricultural implement, comprising:
a controller;
a machine vision module in communication with to the controller; and
a plurality of sensors in communication with the controller, the plurality of sensors including a lift sensor; and
a plurality of actuators in communication with the controller, the plurality of actuators including a plurality of agricultural tool actuators; and
wherein:
the plurality of agricultural tool actuators include a first mode of operation for working a commodity plant field and a second mode of operation for not working a commodity plant field;
upon the lift sensor detecting elevating of the implement, the controller selects the second mode of operation for the plurality of agricultural tool actuators; and upon the lift sensor detecting a lowering of the implement, the controller selects the first mode of operation for the plurality of agricultural tool actuators.

2. The control system of claim 1, wherein:
the plurality of actuators including a side shift actuator to align an agricultural tool of the implement with at least one plant line; and
upon the lift sensor detecting elevating of the implement, the controller operates the actuator to reset an alignment of the agricultural tool of the implement.

3. The control system of claim 2, wherein:
the controller and machine vision module detect a plurality of plant lines; and
upon the lift sensor detecting lowering of the implement, the controller operators the side shift actuator to keep the agricultural tool positioned aligned with the at least one plant line.

4. The control system of claim 1, wherein:
the machine vision module communicates a plurality of images to the controller and the controller is configured to detect objects of interest in the plurality of images; and
the controller is configured to define a coordinate space for locating and tracking the objects of interest relative to the position of at least one of a plurality of agricultural tools of the implement.

5. The control system of claim 4, wherein each of the plurality of images are communicated in a plurality of data packets, at least the first of which includes a timestamp for correlating each of the plurality of images with the coordinate space.

6. The control system of claim 4, wherein:
the plurality of sensors includes an odometer providing data to the controller; and
the controller is configured to use the odometer data to correlate and track the relative positions of the at least one of the plurality of agricultural tools and the objects of interest in the coordinate space as the implement traverses the objects of interest.

7. The control system of claim 6, wherein the odometer data includes a timestamp to correlate the odometer data with the coordinate space, the timestamp calculated as a function of a first time at which the controller requests data from the odometer and a second time at which the controller receives the data from the odometer.

8. The control system of claim 4, wherein:
the controller includes a convolutional neural network; and
processing the plurality of images to detect objects of interest includes the convolutional neural network classifying commodity plants and providing a bounds and a confidence level for each object of interest.

9. The control system of claim 8, wherein:
the controller is configured for post-processing of the objects of interest; and
the post-processing includes reclassifying an object of interest having at least one of a size of the bounds outside of a selected threshold range and the confidence level below a selected threshold.

10. The control system of claim 8, wherein:
each of the plurality of images spans at least two plant lines; and
the controller is configured to detect objects of interest in each of the at least two plant lines.

11. The control system of claim 10, wherein:
the controller is configured for post-processing of the objects of interest; and
the post-processing includes reclassifying an object of interest based on a relative distance of the object of interest to at least one of a threshold for plant interval spacing and an alignment threshold for the plant line.

12. The control system of claim 4, wherein:
the controller is configured to classify a subset of the objects of interest as commodity plants; and
the controller is configured to operate the plurality of agricultural tool actuators to work a plurality of agricultural tools of the implement on the subset.

13. The control system of claim 4, wherein:
the controller is configured to classify a subset of the objects of interest as commodity plants; and the controller is configured to operate the plurality of agricultural tool actuators to work a plurality of agricultural tools of the implement around the subset.

14. The control system of claim 13, wherein:
the plurality of agricultural tools includes pairs of cultivator blades that straddle a plant line and the plurality of agricultural tool actuators operate to open and close each pair of cultivator blades; and
the controller is configured to operate the plurality of agricultural tool actuators to open each pair of cultivator blades to a first distance before traversing one of the commodity plants and close each pair of cultivator blades a second distance after traversing the one of the commodity plants.

15. The control system of claim 14, wherein the controller is configured to operate the plurality of agricultural tool actuators to keep at least one of the pairs of cultivator blades open upon the controller determining a rate of traversing the commodity plants is too great to detect and track the commodity plants and open each pair of cultivator blades before traversing one of the commodity plants.

16. The control system of claim 14, wherein the controller is configured to operate the plurality of agricultural tool actuators to keep at least one of the pairs of cultivator blades open upon the controller determining a subsequent commodity plants is too close to the one of the commodity plants to close and again open the pair of cultivator blades before traversing subsequent commodity plant.

17. The control system of claim 4, wherein:
the controller is configured to classify a subset of the objects of interest as not commodity plants; and
the controller is configured to operate the plurality of agricultural tool actuators to work a plurality of agricultural tools of the implement on the subset.

18. The control system of claim 1, wherein:
the plurality of actuators includes at least a first lift actuator for translating at least a first one of a plurality of agricultural tools of the implement along a vertical axis and at least a second lift actuator for translating at least a second one of the plurality of agricultural tools of the implement along the vertical axis;
the plurality of sensors includes a first ground following sensor coupled with the at least first one of a plurality of agricultural tools, the first ground following sensor providing first data to the controller based on the position of the at least first one of the plurality of agricultural tools relative to a first working surface of a field;
the plurality of sensors includes a second ground following sensor coupled to the at least second one of the plurality of agricultural tools, the second ground following sensor providing second data to the controller based on the position of the second one of the plurality of agricultural tools relative to a second working surface of the field; and
the controller is configured to operate independently the at least first lift actuator based at least in part on the first data to maintain a preset vertical position of the at least first one of the plurality of agricultural tools relative to the first working surface of the field, and the at least second lift actuator based at least in part on the second data to maintain the present vertical position of the at least second one of the plurality of agricultural tools relative to the second working surface of the field.

19. The control system of claim 1, further comprising an electrical generator; and
wherein:
the implement includes a hydraulic system including a power-take-off driven hydraulic pump for powering a hydraulic system; and
the hydraulic system drives the electrical generator.

20. The control system of claim 1, further comprising a user interface in communication with the controller.

21. The control system of claim 20, wherein selectable parameters of the controller via the user interface include at least one of commodity plant type, plant interval spacing, plant line spacing, and plant safe zone thresholds.

* * * * *